United States Patent
Suzuki et al.

(10) Patent No.: US 9,674,641 B2
(45) Date of Patent: Jun. 6, 2017

(54) BASE STATION DEVICE

(71) Applicant: FUJITSU LIMITED, Kawasaki-shi, Kanagawa (JP)

(72) Inventors: Takahiro Suzuki, Sendai (JP); Koki Yamagata, Sendai (JP); Fusako Ishino, Sendai (JP); Hiroyasu Nakagawa, Sendai (JP); Noriyoshi Takahashi, Sendai (JP); Yuuitsu Ogata, Sendai (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/083,560

(22) Filed: Mar. 29, 2016

(65) Prior Publication Data

US 2016/0337782 A1 Nov. 17, 2016

(30) Foreign Application Priority Data

May 11, 2015 (JP) .................. 2015-096931

(51) Int. Cl.
*H04W 4/00* (2009.01)
*H04W 52/02* (2009.01)
*H04W 88/08* (2009.01)

(52) U.S. Cl.
CPC ....... *H04W 4/005* (2013.01); *H04W 52/0206* (2013.01); *H04W 88/08* (2013.01); *Y02B 60/50* (2013.01)

(58) Field of Classification Search
CPC . H04W 4/005; H04W 28/08; H04W 28/0215; H04W 88/08; H04W 52/0206; H04W 72/044
USPC ................................. 455/560, 561
See application file for complete search history.

(56) References Cited

U.S. PATENT DOCUMENTS

2011/0256896 A1* 10/2011 Giaretta .................. H04W 4/00
455/509
2012/0287854 A1* 11/2012 Xie ........................ H04W 48/08
370/328

FOREIGN PATENT DOCUMENTS

| JP | 2003-347985 | 12/2003 |
| JP | 2004-235969 | 8/2004 |
| JP | 2007-134840 | 5/2007 |
| JP | 2009-60171 | 3/2009 |

OTHER PUBLICATIONS

3GPP TS 23.682 V11.5.0 (Sep. 2013) 4.4.3 HSS/HLR, pp. 13 (1 page).
3GPP TS 24301 V11.12.0 (Oct. 2014) 8.2.4, Attach Request, pp. 215-218 (4 pages).
3GPP TS 24301 V11.12.0 (Oct. 2014) 9.9.3.12 EPS mobile identity, pp. 271-274 (4 pages).

* cited by examiner

Primary Examiner — Thai Vu
(74) Attorney, Agent, or Firm — Fujitsu Patent Center

(57) ABSTRACT

A base station device uses a first card as an M2M card, second cards as general cards, and a third card as a spare card from among call process cards included in a signal processing unit. A call control unit allocates, to the M2M card, a call that is received from an M2M terminal and in which the service type determined by a service type determination unit is an M2M service. Furthermore, the call control unit allocates, to a general card, a call that is received from a general terminal and in which the service type determined by service type determination unit is a general service.

6 Claims, 27 Drawing Sheets

| 8 | 7 | 6 | 5 | 4 | 3 | 2 | 1 | |
|---|---|---|---|---|---|---|---|---|
| EPS mobile identity IEI ||||||||  octet1 |
| Length of EPS mobile identity contents |||||||| octet2 |
| Identity digit 1 |||| Odd/even indic | Type of identity ||| octet3 |
| Identity digit p+1 |||| Identity digit p |||| octet4 |

| IMSI |
|---|
| 123456789012345 |
| 123456789012346 |
| ⋮ |

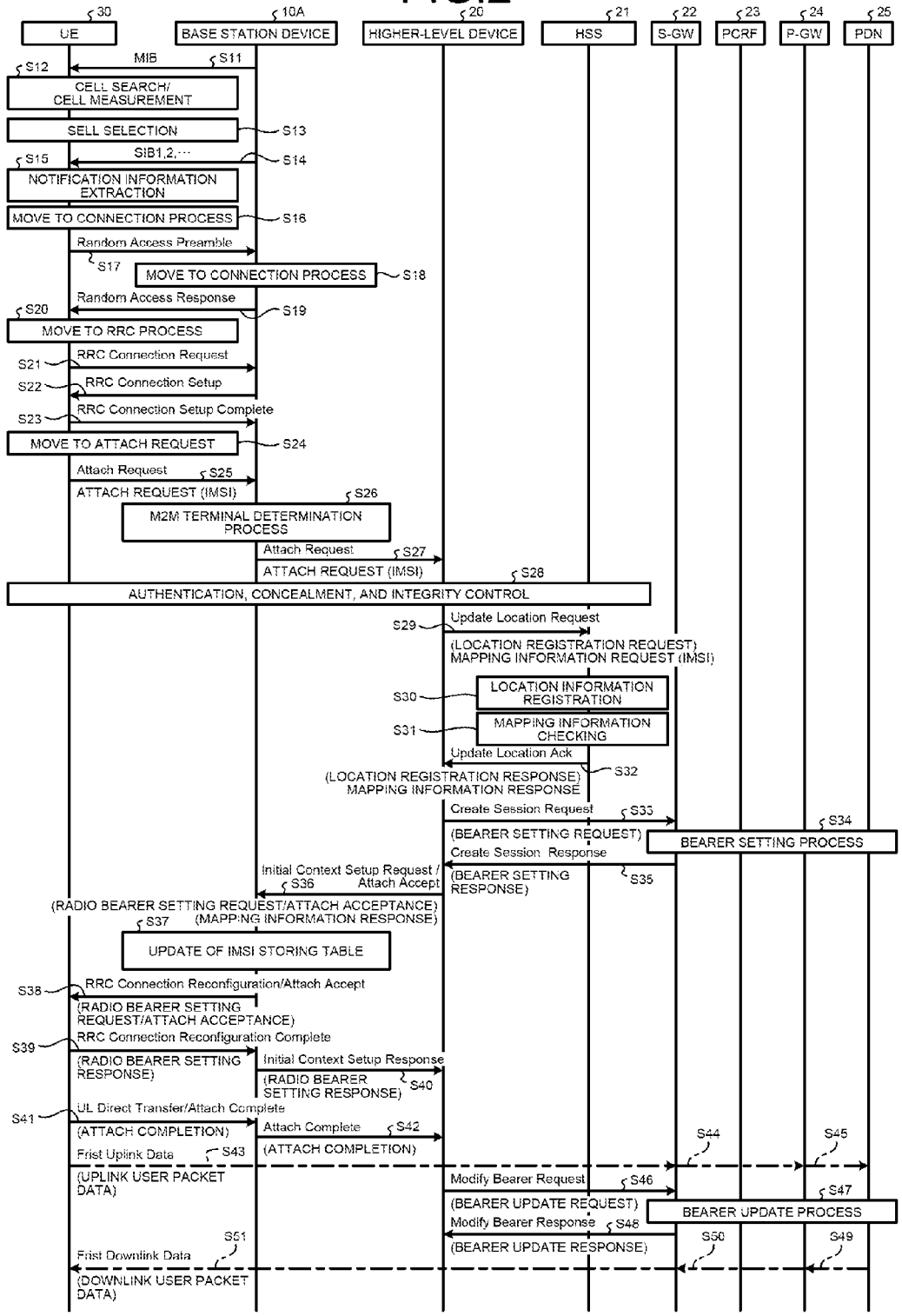

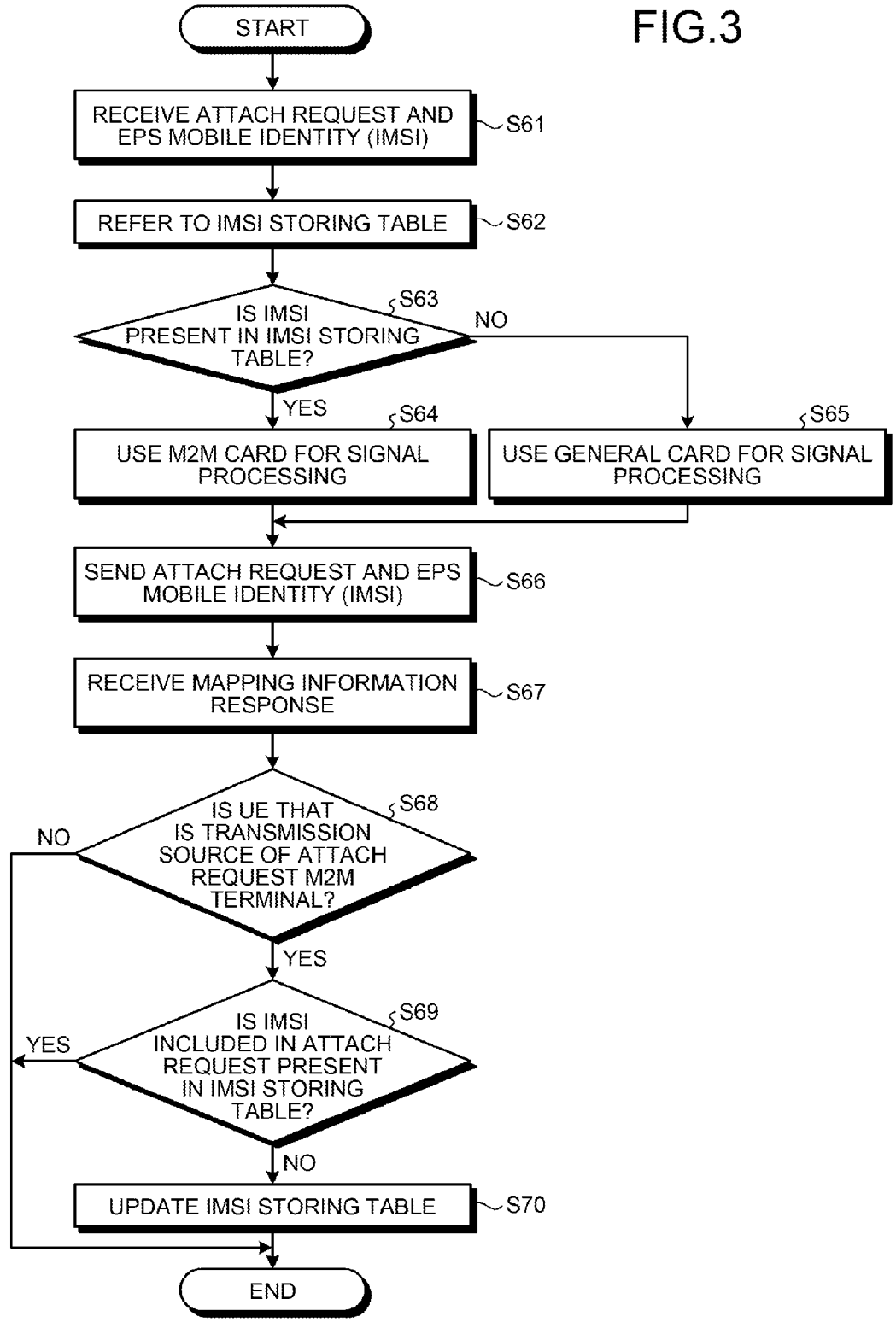

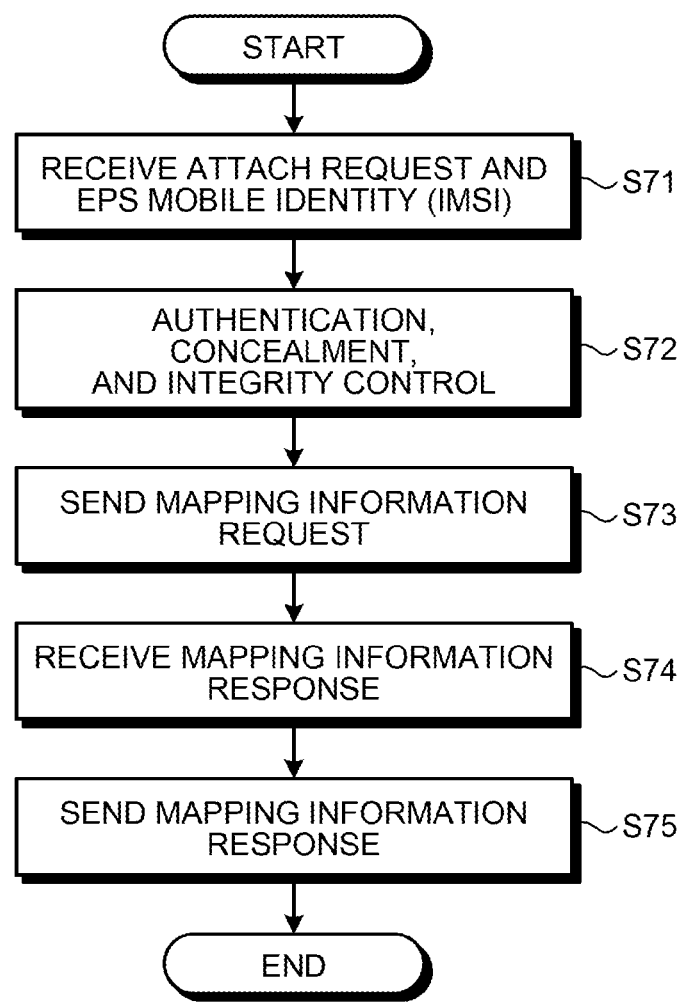

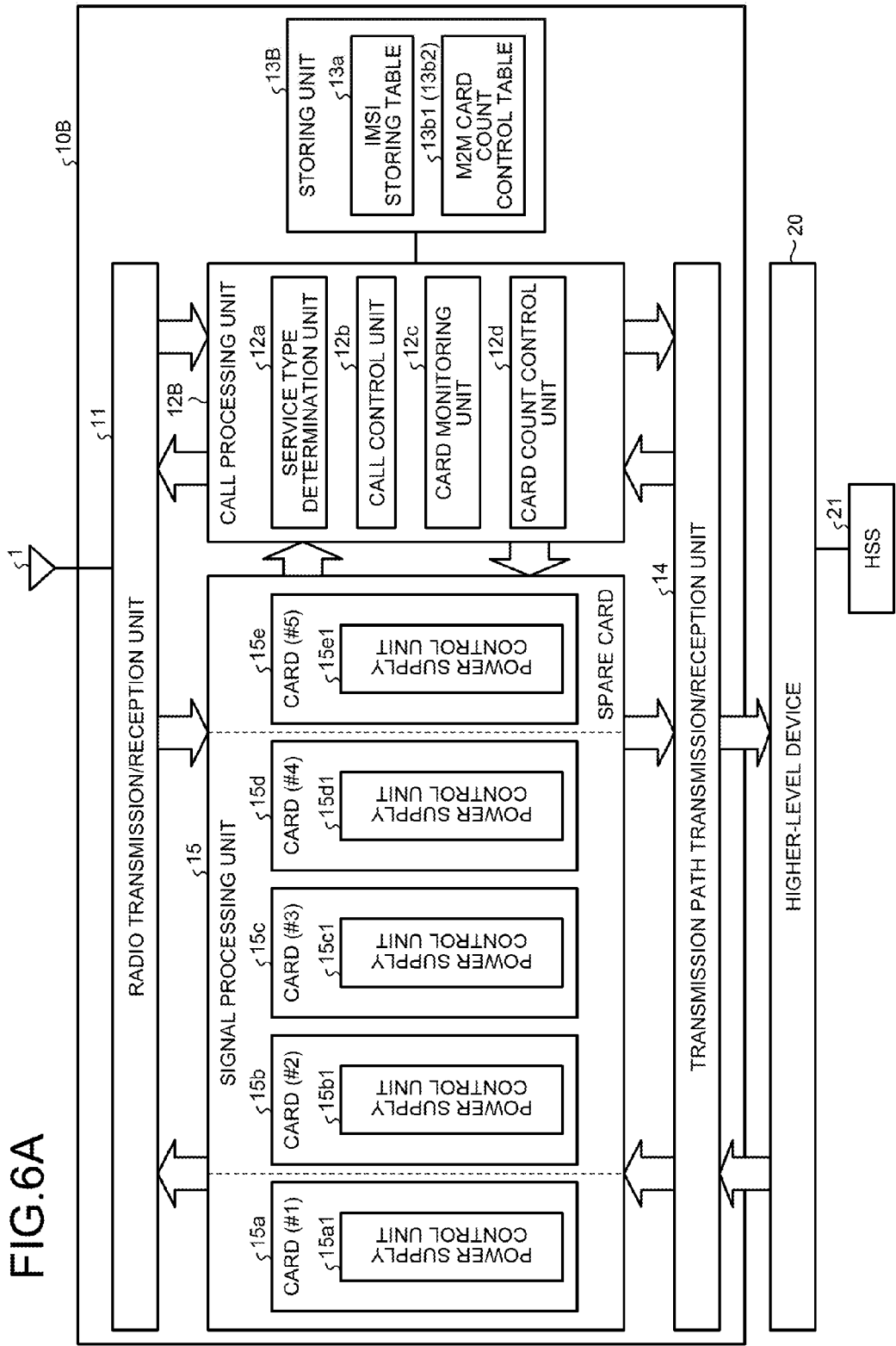

FIG.6B

| NUMBER OF M2M CARDS | RANGE OF M2M CALL THROUGHPUT PREDICTED VALUE T |
|---|---|
| 1 | $0 \leq T < T1$ |
| 2 | $T1 \leq T < 2 \times T1$ |
| 3 | $2 \times T1 \leq T \leq 3 \times T1$ |

13b1

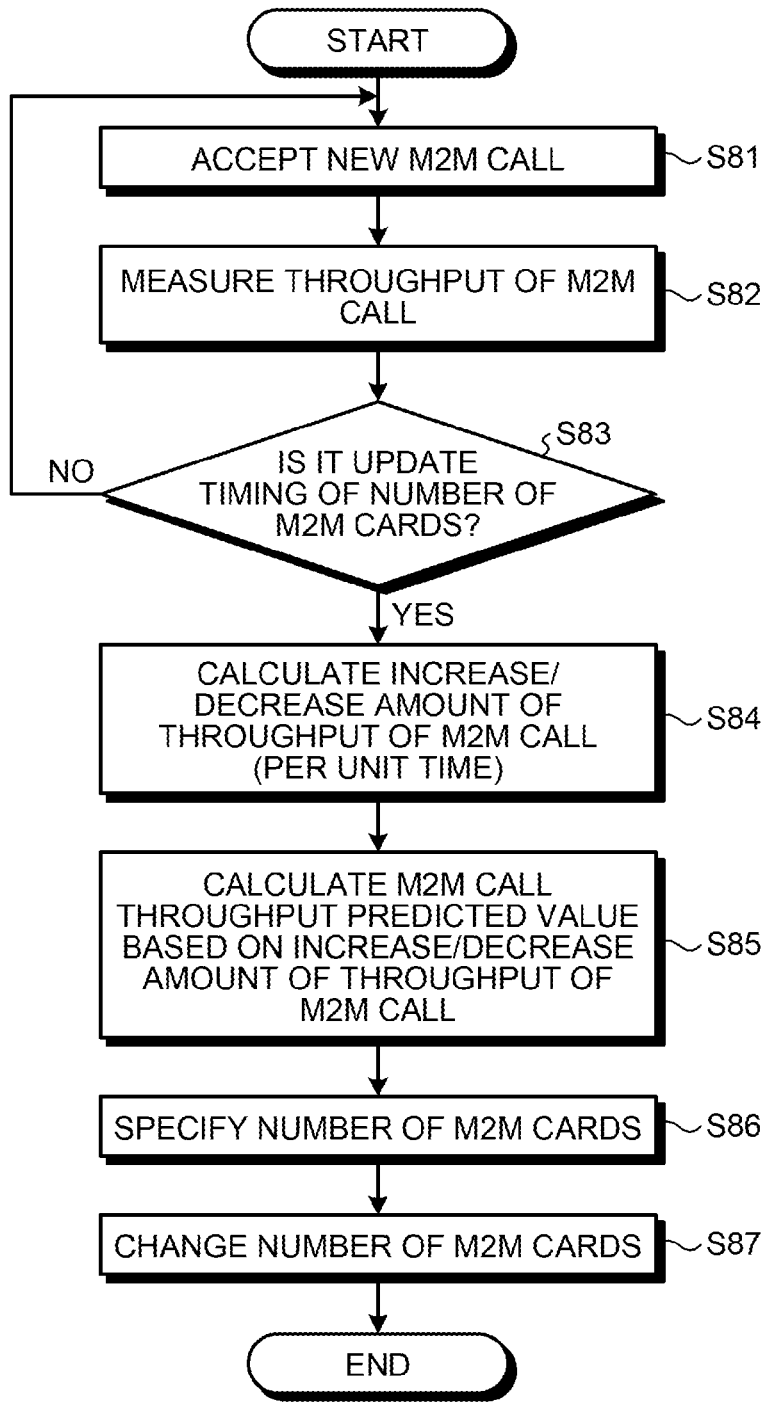

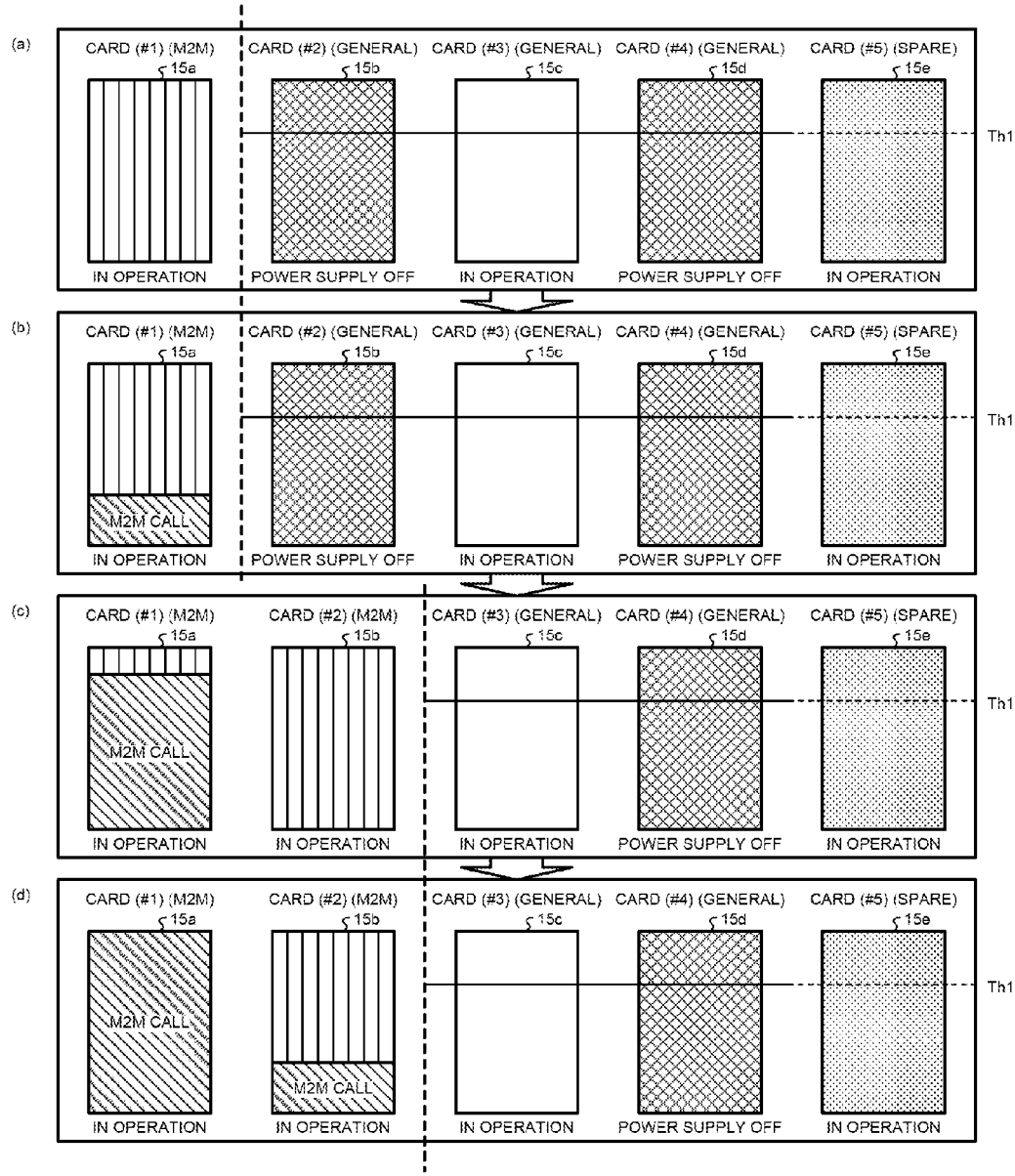

FIG.9

| LIMITED AMOUNT | NUMBER OF M2M CARDS | RANGE OF M2M CALL THROUGHPUT PREDICTED VALUE T |
|---|---|---|
| 0.5 | 1 | $0 \leq T < 0.5 \times T1$ |
| 1 | 1 | $0.5 \times T1 \leq T < T1$ |
| 1.5 | 2 | $T1 \leq T \leq 1.5 \times T1$ |
| 2 | 2 | $1.5 \times T1 \leq T < 2 \times T1$ |
| 2.5 | 3 | $2 \times T1 \leq T < 2.5 \times T1$ |
| 3 | 3 | $2.5 \times T1 \leq T \leq 3 \times T1$ |

13b2

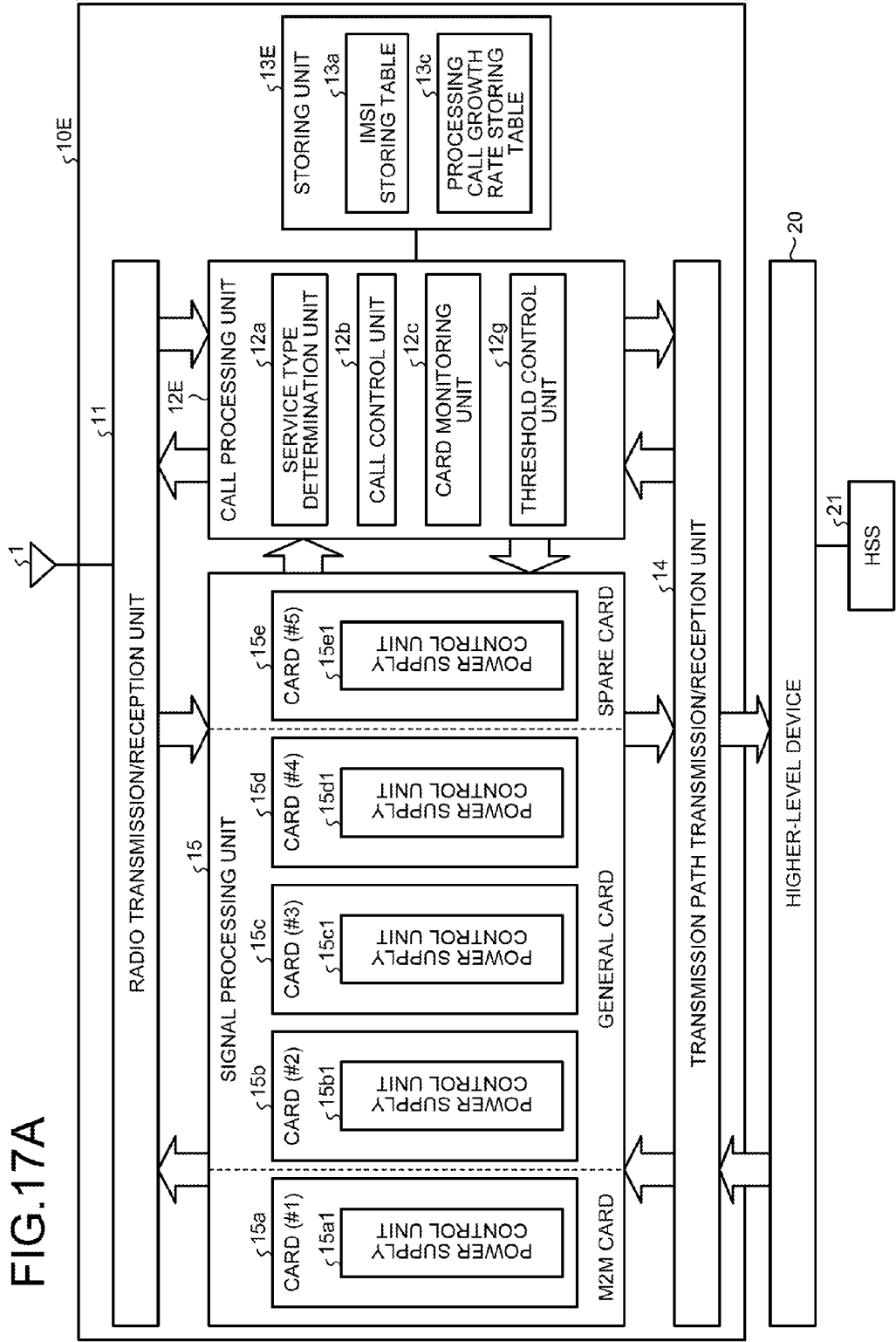

FIG.17B

| PROCESSING CALL AMOUNT GROWTH RATE | TIME STAMP |
|---|---|
| x1 | 2015/4/1 17:10 |
| x2 | 2015/4/1 18:15 |
| ⋮ | ⋮ |

13c

BASE STATION DEVICE

CROSS-REFERENCE TO RELATED APPLICATION

This application is based upon and claims the benefit of priority of the prior Japanese Patent Application No. 2015-096931, filed on May 11, 2015, the entire contents of which are incorporated herein by reference.

FIELD

The embodiments discussed herein are related to a base station device.

BACKGROUND

Conventionally, base station devices used in carrier radio communication have processing cards that perform signal processing related to call processes. Each of the processing cards can perform signal processing related to a plurality of call processes. When allocating calls to each of the processing cards, a base station device allocates, in a concentrated manner, the call processes to processing cards in a minimum number of cards. Consequently, the base station devices can make the power supply of the processing card in which the call process is not allocated off and can suppress electrical power consumption.

Patent Document 1: Japanese Laid-open Patent Publication No. 2004-235969
Patent Document 2: Japanese Laid-open Patent Publication No. 2009-060171
Patent Document 3: Japanese Laid-open Patent Publication No. 2003-347985
Patent Document 4: Japanese Laid-open Patent Publication No. 2007-134840

In recent years, M2M (Machine to Machine, hereinafter, referred to as M2M communication) indicating that machines autonomously perform communication is becoming widely used and, in also the field of radio communication, terminals that perform M2M communication are increased. Because an amount of data is small in a call of the M2M communication (hereinafter, referred to as an M2M call), a call process itself in a processing card ends in a short time. However, M2M calls are often simultaneously requested from a lot of terminals. Thus, after a lot of M2M calls are simultaneously allocated to processing cards and the processing cards are occupied by the M2M calls, each of the call processes ends in a short time.

Here, if a base station device allocates calls to processing cards without distinguishing M2M calls from general calls, there may be a case in which, processing cards are started up one after another and, after the end of the call processes of the M2M calls in a plurality of processing cards, the call processes of the general calls are continued. Consequently, in a conventional technology, with a method of suppressing electrical power consumed in base station devices, there is a problem in that, in a plurality of processing cards, the power supply is not able to be shut off because call processes of the general calls are continued and it is difficult to reduce the electrical power consumed in a base station device.

SUMMARY

According to an aspect of an embodiment, a base station device includes a first signal processing card that performs signal processing related to M2M (Machine to Machine) communication with a radio communication terminal, a second signal processing card that performs signal processing related to general communication, which is other than the M2M communication, with a radio communication terminal, a determination unit that determines, from a user identifier of a radio communication terminal received from the radio communication terminal, whether the type of communication with the radio communication terminal is the M2M communication, and a control unit that allocates, to the first signal processing card, the signal processing related to the M2M communication with the radio communication terminal in which the type of communication is determined to be the M2M communication by the determination unit, and that allocates, to the second signal processing card, the signal processing related to the general communication with the radio communication terminal in which the type of communication is determined to be the general communication by the determination unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a sequence diagram illustrating an example of a location registration process according to the first embodiment;

FIG. 3 is a flowchart illustrating an example of an M2M terminal determination process according to the first embodiment;

FIG. 4 is a flowchart illustrating an example of a UE identifier acquisition process according to the first embodiment;

FIG. 6A is a block diagram illustrating an example of a base station device according to a second embodiment;

FIG. 6B is a schematic diagram illustrating an example of an M2M card count control table according to the second embodiment;

FIG. 7 is a flowchart illustrating an example of an M2M card count control process according to the second embodiment;

FIG. 8 is a schematic diagram illustrating an example of the M2M card count control process according to the second embodiment;

FIG. 9 is a schematic diagram illustrating an example of an M2M card count control table according to another embodiment of the second embodiment;

FIG. 17A is a block diagram illustrating an example of a base station device according to a fifth embodiment;

FIG. 17B is a schematic diagram illustrating an example of a processing call growth rate storing table according to the fifth embodiment;

DESCRIPTION OF EMBODIMENTS

Preferred embodiments of the present invention will be explained with reference to accompanying drawings. The disclosed technology is not limited to the embodiments described below. Furthermore, the embodiments can be used in any appropriate combination as long as processes do not conflict with each other. Each of the embodiments will be described by using an example of communication conforming to Long Term Evolution (LTE, registered trademark). However, the communication method is not limited to LTE but the disclosed technology may also be used for any communication as long as M2M communication can be used for the communication.

[a] First Embodiment

In a first embodiment, a base station device includes dedicated a processing card (hereinafter, referred to as an M2M card) that processes a call received from an M2M terminal that performs M2M communication and includes processing cards (hereinafter, referred to as general cards) each of which processes a call other than the M2M call (hereinafter, referred to as a general call). The M2M terminal may also be referred to as a Machine Type Communication (MTC) terminal. In the first embodiment, when performing a call process related to communication with user equipment (UE, i.e., user terminal), the base station device performs a call process on a M2M call by using an M2M card in which the power supply thereof is always applied. Furthermore, the base station device performs the call process on a general call by using a general card in which the power supply is applied when a call process is performed and the power supply is shut off when a call process is not performed.

Base Station Device According to the First Embodiment

Figure 1A:
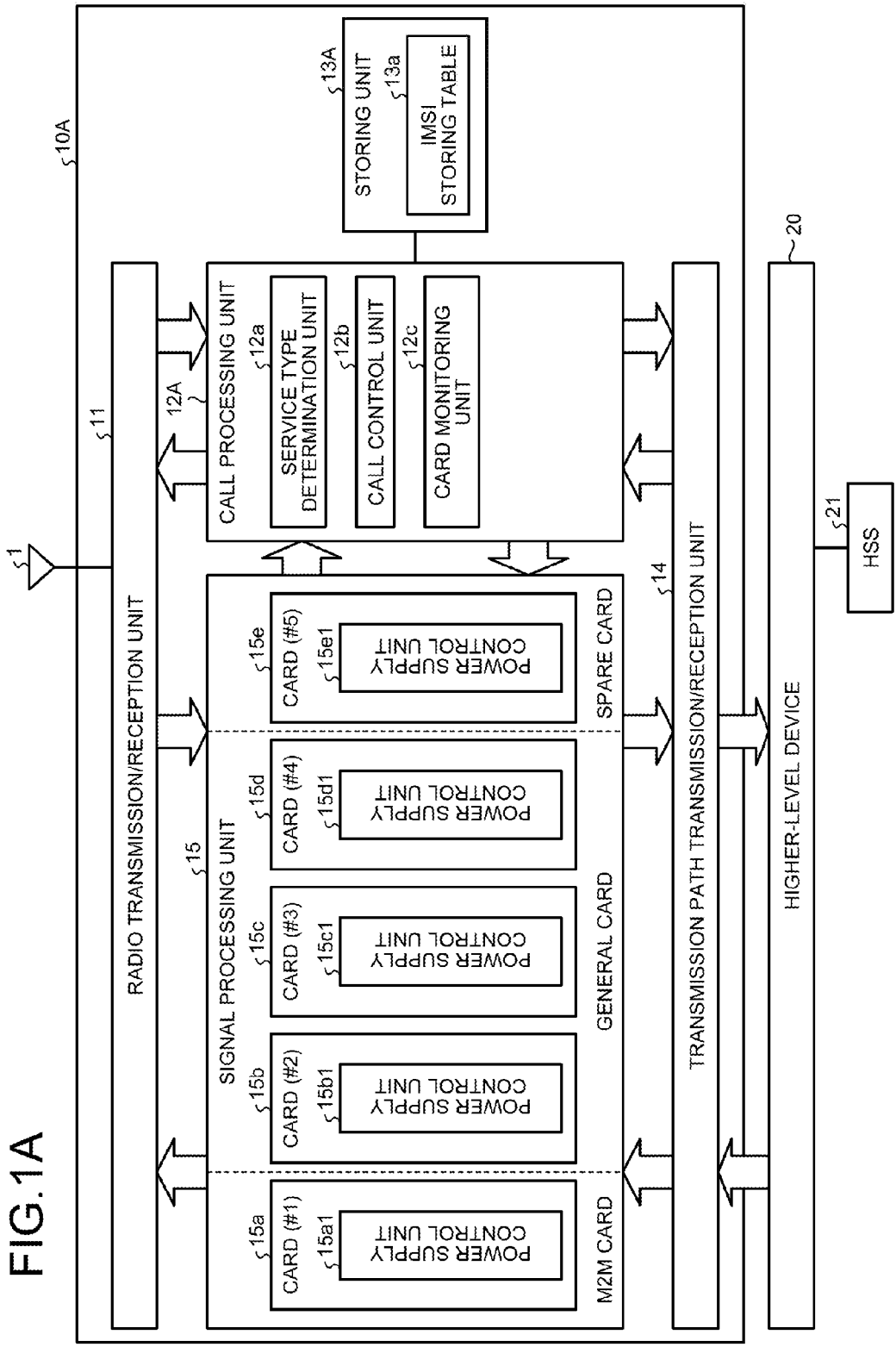
FIG. 1A is a block diagram illustrating a base station device according to a first embodiment.

FIG. 1A is a block diagram illustrating a base station device according to a first embodiment. FIG. 1 illustrates only the block related to the first embodiment from among blocks in a base station device 10A according to the first embodiment and other blocks are omitted.

The base station device 10A is connected to a higher-level device 20, such as Mobility Management Entity (MME) or the like. The higher-level device 20 is connected to a Home Subscriber Server (HSS) 21 or the like. The HSS 21 stores therein user information or the like that is used to perform authentication and approval of a user of a carrier network that includes the base station device 10A.

Figures 1B, 1C:
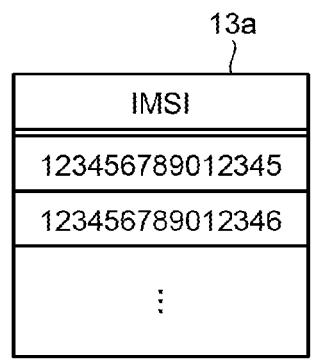
FIG. 1B is a schematic diagram illustrating an example of a data format of an IMSI.
FIG. 1C is a schematic diagram illustrating an example of an IMSI storing table according to the first embodiment.

The user information includes therein mapping information in which UE identifiers and International Mobile Subscriber Identities (IMSIs) are associated. FIG. 1B is a schematic diagram illustrating an example of a data format of the IMSI. The IMSI is information for identifying each of the UEs and is data with the format illustrated in, for example, FIG. 1B. The IMSI is an example of a user identifier. The UE identifier includes therein the information indicating whether the UE with the associated IMSI is a terminal that performs M2M communication (hereinafter, referred to as an M2M terminal). Namely, the base station device 10A can determine, on the basis of the UE identifier associated with the IMSI, whether the UE associated with the subject IMSI is an M2M terminal. In a description below, a terminal other than the M2M terminal is referred to as a general terminal.

The base station device 10A includes, for example, as illustrated in FIG. 1A, an antenna 1, a radio transmission/reception unit 11, a call processing unit 12A, a storing unit 13A, a transmission path transmission/reception unit 14, and a signal processing unit 15.

After the radio transmission/reception unit 11 performs a predetermined process on a downlink signal that is output from the signal processing unit 15 and that is sent to an UE, which is not illustrated, the radio transmission/reception unit 11 sends the signal to the UE via the antenna 1. Furthermore, after the radio transmission/reception unit 11 performs a predetermined process on an uplink signal that is received from an UE received via the antenna 1, the radio transmission/reception unit 11 outputs the signal to the signal processing unit 15. Furthermore, the radio transmission/reception unit 11 may also use a Remote Radio Head (RRH) or the like.

The call processing unit 12A includes a service type determination unit 12a, a call control unit 12b, and a card monitoring unit 12c. The call processing unit 12A is implemented by a processing card having mounted thereon, for example, a central processing unit (CPU) or the like. When the base station device 10A communicates with an UE, the service type determination unit 12a determines, on the basis of the IMSI that is associated with the UE and that is included in an attach request sent from the UE, whether the subject UE is an M2M terminal that performs M2M communication.

For example, the service type determination unit 12a refers to the storing unit 13A on the basis of the IMSI sent from the UE. Then, if the IMSI sent from the UE is stored in an IMSI storing table 13a in the storing unit 13A, which will be described later, the service type determination unit 12a determines that the subject UE is the M2M terminal and determines that the service type of the communication with the subject UE is the M2M service. In contrast, if the IMSI sent from the UE is not stored in the IMSI storing table 13a in the storing unit 13A, the service type determination unit 12a determines that the subject UE is a general terminal and determines that the service type of the communication with the UE is a general service.

Furthermore, the service type determination unit 12a sends a query to the higher-level device 20 on the basis of the IMSI sent from the UE and then acquires the UE identifier associated with the subject IMSI from the higher-level device 20. Then, if the UE identifier acquired from the higher-level device 20 indicates the M2M terminal, the service type determination unit 12a determines that the service type of the communication with the UE that is the transmission source of the IMSI is the M2M service. Then, the service type determination unit 12a stores, in the IMSI storing table 13a, the IMSI of the UE that performs the communication in which the service type is determined to be the M2M service.

The call control unit 12b allocates, to an M2M card, a call of an M2M terminal in which the service type determined by the service type determination unit 12a is the M2M service. Furthermore, the call control unit 12b allocates, to a general card, a call of a general terminal in which the service type determined by the service type determination unit 12a is the general service. Furthermore, if an amount of call that is being processed by an M2M card to which a new M2M call is allocated reaches the maximum value, the call control unit 12b may also discard the new M2M call. Furthermore, if an amount of call that is being processed by a general card to which a new general call is allocated reaches the maximum value, the call control unit 12b may also discard the new general call. Furthermore, in the first embodiment, as will be described later, from among the processing cards included in the signal processing unit 15, the call control unit 12b allocates a card 15a to the M2M cards, allocates cards 15b to 15d to the general cards, and allocates a card 15e to a spare card. Namely, the base station device 10A includes N+1 processing cards.

The card monitoring unit 12c monitors, for each general card, an amount of call of a general call that is being processed and that is allocated to a general card. If the card monitoring unit 12c detects a general card in which an amount of general call that is being processed becomes equal to or greater than a predetermined threshold (Th1, a channel threshold), in order to allocate the subsequent new general call, the card monitoring unit 12c applies the power supply of one of the other general cards in each of which the power supply is shut off. Furthermore, the card monitoring unit 12c shuts off the power supply of the general card in which the entirety of the call process of the general call that is being processed has been ended.

The storing unit 13A is a volatile or nonvolatile storage device. The storing unit 13A stores therein the IMSI storing table 13a. FIG. 1C is a schematic diagram illustrating an example of an IMSI storing table according to the first embodiment. As illustrated in FIG. 1C, the IMSI storing table 13a stores therein the IMSIs of the M2M terminals.

After the transmission path transmission/reception unit 14 performs a predetermined process on a downlink signal sent from the higher-level device 20 to the UE, the transmission path transmission/reception unit 14 outputs the signal to the signal processing unit 15. Furthermore, after the transmission path transmission/reception unit 14 performs a predetermined process on an uplink signal that is sent from an UE and that is output by the signal processing unit 15, the transmission path transmission/reception unit 14 outputs the signal to the higher-level device 20. The transmission path transmission/reception unit 14 is implemented by, for example, a network processor (NWP) or the like.

The signal processing unit 15 includes the cards 15a to 15e. Each of the cards 15a to 15e is implemented by a processing card having mounted thereon, for example, a Digital Signal Processor (DSP), or the like. The cards 15a to 15e includes power supply control units 15a1 to 15e1, respectively. In the embodiments, the card 15a is an M2M card and the power supply is always applied regardless of whether the M2M communication is allocated. In response to an instruction from the card monitoring unit 12c, the power supply control unit 15a1 in the card 15a applies the power supply to the card 15a, when, for example, the base station device 10A is started up.

In the embodiments, the cards 15b to 15d are the general cards. In response to an instruction from the card monitoring unit 12c, power supply control units 15b1 to 15d1 in the cards 15b to 15d, respectively, apply the power supply to the cards 15b to 15d, respectively, and shut off the power supply.

Furthermore, the card 15e is a spare card in which the power supply is always applied after a startup of, for example, the base station device 10A. If an amount of call that is being subjected to a call process in all of the cards, i.e., the cards 15b to 15d that are the general cards, reaches a processing limited amount that indicates an amount of call that can be processed in the subject cards, the call control unit 12b allocates a new general call to the card 15e that is a spare card. Then, if the amount of call that is being subjected to the call process in a card, which is one of the cards 15b to 15d that are the general cards, is less than the processing limited amount, the call control unit 12b allocates a new general call to the general card in which the amount of call that is being subjected to the call process is below the processing limited amount.

Furthermore, in the embodiments, the signal processing unit 15 includes a single M2M card, three general cards, and a single spare card; however, the number of cards included in the signal processing unit 15 and the breakdown of the cards are only examples. Thus, any number of cards may also be used for each of the M2M cards, the general cards, and the spare cards included in the signal processing unit 15 as long as one or more cards are used for each of the cards.

Sequence of the Location Registration Process According to the First Embodiment

FIG. 2 is a sequence diagram illustrating an example of a location registration process according to the first embodiment. The location registration process is performed every time a cell search is performed by, for example, an UE 30. First, the base station device 10A sends a Master Information Block (MIB) to all of the UEs 30 in the own area (Step S11). Each of the UE 30 performs cell search/cell measurement (Step S12) and selects a cell (Step S13).

Then, the UE 30 receives a System Information Block 1, 2, . . . (SIB) sent from the base station device 10A (Step S14). Then, the UE 30 extracts notification information from the received SIB (Step S15). Then, the UE 30 moves to a connection process with the base station device 10A (Step S16).

Then, the UE 30 sends a Random Access Preamble to the base station device 10A (Step S17). Then, the base station device 10A that has received the Random Access Preamble from the UE 30 moves to a connection process with the UE 30 (Step S18). Then, the base station device 10A sends a Random Access Response to the UE 30 (Step S19).

Then, the UE 30 that has received the Random Access Response from the base station device 10A moves to a Radio Resource Control (RRC) process (Step S20). Then, the UE 30 sends an RRC Connection Request to the base station device 10A (Step S21). Then, the base station device 10A sends an RRC Connection Setup to the UE 30 (Step S22). Then, the UE 30 sends an RRC Connection Setup Complete to the base station device 10A (Step S23).

Then, the UE 30 moves to an attach request (Step S24). The UE 30 sends the Attach Request (attach request) that includes therein the IMSI to the base station device 10A (Step S25). Then, the base station device 10A performs an M2M terminal determination process that determines, on the basis of the IMSI including the attach request received form the UE 30, whether the UE 30 is the M2M terminal (Step S26). Specifically, the base station device 10A determines whether the IMSI included in the attach request is stored in the IMSI storing table 13a (see FIG. 1A). Then, if the IMSI included in the attach request is stored in the IMSI storing table 13a, the base station device 10A determines that the subject attach request is the request from the M2M terminal and then allocates the signal processing related to this call to the card 15a (see FIG. 1A) that is the M2M card.

Furthermore, if the base station device 10A determines, at Step S26, that the attach request is the request from the M2M terminal, the base station device 10A performs the signal processing at Step S27 and the subsequent steps by using the card 15a that is the M2M card. In contrast, before Step S26, because it is not determined whether the UE 30 is the M2M terminal, the base station device 10A performs the signal processing by using one of the cards 15b to 15d that are the general cards. At this point, because the processes before Step S26 are the preliminary stages of a location registration process, for the data allocated to the card 15a that is the M2M card, a reset of DCCH in which an amount of data is relatively small may possibly occur. However, in the processes before Step S26, the resetting of DTCH in which an amount of data is relatively great does not occur. Furthermore, the DCCH is a Dedicated Control Channel. Furthermore, the DTCH is a Dedicated Traffic Channel (dedicated communication channel).

Then, the base station device 10A sends an Attach Request (attach request) including the IMSI to the higher-level device 20 (Step S27). Then, the UE 30, the base station device 10A, the higher-level device 20, and the HSS 21 perform authentication, concealment, and integrity control (Step S28). Then, the higher-level device 20 sends, to the HSS 21, an Update Location Request (location registration request) and a mapping information request (Step S29). In the mapping information request at Step S29, the IMSI that is sent from the UE 30 at Step S25 is included.

Then, in accordance with the location registration request from the higher-level device 20, the HSS 21 registers the location information on the UE 30 in a storing unit, which is not illustrated (Step S30). Then, the HSS 21 refers to the mapping information and checks the UE identifier that is associated with the IMSI included in the mapping information request received from the higher-level device 20 (Step S31). Then, the HSS 21 sends the mapping information response that includes therein the UE identifier specified in the mapping information to the higher-level device 20 together with the Update Location Ack (location registration response) (Step S32).

Then, the higher-level device 20 sends a Create Session Request (bearer setting request) to a Serving GateWay (S-GW) 22 (Step S33). The S-GW 22 performs a bearer setting process with a Policy and Charging Rules Function (PCRF) 23, a PDN GateWay (P-GW) 24, and a Packet Data Network (PDN) 25 (Step S34). Then, the S-GW 22 sends, to the higher-level device 20, a Create Session Response (bearer setting response) (Step S35).

Then, the higher-level device 20 sends, to the base station device 10A, a mapping information response together with an Initial Context Setup Request/Attach Accept (radio bearer setting request/attach acceptance) (Step S36). The base station device 10A determines, on the basis of the UE identifier included in the mapping information response received from the higher-level device 20, whether the UE 30 is the M2M terminal.

If the UE identifier included in the mapping information response received from the higher-level device 20 indicates the M2M terminal, the base station device 10A additionally registers the IMSI received form the UE 30 in the IMSI storing table 13a and updates the table (Step S37). However, at Step S37, if the IMSI targeted for the registration has already been registered in the IMSI storing table 13a, the base station device 10A does not perform the additional registration.

Then, the base station device 10A sends the RRC Connection Reconfiguration/Attach Accept (radio bearer setting request/attach acceptance) to the UE 30 (Step S38). Then, the UE 30 sends the RRC Connection Reconfiguration Complete (radio bearer setting response) to the base station device 10A (Step S39).

Then, the base station device 10A sends, to the higher-level device 20, the Initial Context Setup Response (radio bearer setting response) (Step S40). Then, the UE 30 sends, to the base station device 10A, UL Direct Transfer/Attach Complete (attach completion) (Step S41). Then, the base station device 10A sends, to the higher-level device 20, the Attach Complete (attach completion) (Step S42).

Then, the UE 30 sends, to the S-GW 22, First Uplink Data (uplink user packet data) (Step S43). The S-GW 22 transfers the First Uplink Data to the P-GW 24 (Step S44) and the P-GW 24 transfers the First Uplink Data to the PDN 25 (Step S45).

Then, the higher-level device 20 sends, to the S-GW 22, a Modify Bearer Request (bearer update request) (Step S46). Then, the S-GW 22 that has received the Modify Bearer Request from the higher-level device 20 performs a bearer update process with the PCRF 23, the P-GW 24, and the PDN 25 (Step S47). Then, the S-GW 22 sends, to the higher-level device 20, a Modify Bearer Response (bearer update response) (Step S48).

Then, the PDN 25 sends, to the P-GW 24, the First Downlink Data (downlink user packet data) (Step S49). The P-GW 24 transfers the First Downlink Data to the S-GW 22 (Step S50), whereas the S-GW 22 transfers the First Downlink Data to the UE 30 (Step S51). Subsequently, the UE 30 and the PDN 25 send and receive the Uplink Data and the Downlink Data via the S-GW 22 and the P-GW 24.

Flow of the M2M Terminal Determination Process According to the First Embodiment FIG. 3 is a flowchart illustrating an example of an M2M terminal determination process according to the first embodiment. The M2M terminal determination process is performed every time, for example, an attach process is performed by the UE 30. First, the base station device 10A receives an attach request from the UE 30 (see FIG. 2) (Step S61). The EPS Mobile Identity (IMSI) is included in the attach request from the UE 30. Then, the base station device 10A refers to the IMSI storing table 13a (see FIG. 1A) on the basis of the IMSI received at Step S61 (Step S62).

Then, the base station device 10A determines whether the IMSI included in the attach request received from the UE 30 is present in the IMSI storing table 13a (Step S63).

If the IMSI included in the attach request received from the UE 30 is present in the IMSI storing table 13a (Yes at Step S63), the base station device 10A performs the process indicated by Step S64. In contrast, if the IMSI included in the attach request received from the UE 30 is not present in the IMSI storing table 13a (No at Step S63), the base station device 10A performs the process indicated by Step S65. Furthermore, a case in which it is determined that the IMSI is not present in the IMSI storing table 13a at Step S63 is a case in which the IMSI received at Step S61 is the IMSI that is received from a terminal that is other than the M2M terminal or a case in which, even if the IMSI is received from the M2M terminal, the IMSI is received first time.

At Step S64, the base station device 10A allocates, to the M2M card, the signal processing of the call related to the IMSI that is determined to be present in the IMSI storing table 13a at Step S63. In contrast, at Step S65, the base station device 10A allocates, to the general card, the signal processing of a call related to the IMSI that is determined not to be present in the IMSI storing table 13a at Step S63. After the base station device 10A ends the process at Step S64 or Step S65, the base station device 10A performs the process at Step S66.

At Step S66, the base station device 10A sends the attach request received at Step S61 to the higher-level device 20. Then, the base station device 10A receives, from the higher-level device 20, the mapping information response of the IMSI acquired by the higher-level device 20 from the HSS 21 (see FIG. 1A) (Step S67).

Then, the base station device 10A determines, on the basis of the UE identifier included in the mapping information response received from the higher-level device 20, whether the UE 30 that is the transmission source of the attach request is the M2M terminal (Step S68). If the UE 30 that is the transmission source of the attach request is the M2M terminal (Yes at Step S68), the base station device 10A performs the process indicated by Step S69. In contrast, if the UE 30 of the transmission source of the attach request is not the M2M terminal (No at Step S68), the base station device 10A ends the M2M terminal determination process.

At Step S69, the base station device 10A determines whether the IMSI included in the attach request is present in the IMSI storing table 13a. If the IMSI included in the attach request is present in the IMSI storing table 13a (Yes at Step S69), the base station device 10A ends the M2M terminal determination process. In contrast, if the IMSI included in the attach request is not present in the IMSI storing table 13a (No at Step S69), the base station device 10A performs the process indicted by Step S70.

At Step S70, the base station device 10A updates the IMSI storing table 13a by adding the IMSI included in the attach request to the IMSI storing table 13a. After the process at Step S70 has been ended, the base station device 10A ends the M2M terminal determination process.

Flow of a Mapping Information Acquisition Process According to the First Embodiment FIG. 4 is a flowchart illustrating an example of a UE identifier acquisition process according to the first embodiment. The UE identifier acquisition process is performed every time, for example, the attach process is performed by the UE 30. First, the higher-level device 20 receives an attach request from the base station device 10A (Step S71). The EPS Mobile Identity (IMSI) is included in the attach request from the base station device 10A. Then, the higher-level device 20 performs authentication, concealment, and integrity control with the UE 30 that has sent the attach request to the base station device 10A (see FIG. 2), the base station device 10A, and the HSS 21 (see FIG. 2) (Step S72).

Then, the higher-level device 20 performs a location registration request with respect to the HSS 21 on the basis of the attach request received at Step S71. Then, the higher-level device 20 sends, to the HSS 21, the mapping information request that includes therein the IMSI that is included in the attach request received at Step S71 (Step S73). Then, the higher-level device 20 receives, from the HSS 21, the mapping information response that includes the UE identifier (Step S74). Then, the higher-level device 20 sends, to the base station device 10A, the mapping information response received at Step S74 (Step S75) and ends the mapping information acquisition process.

Call Process According to the First Embodiment

Figure 5:
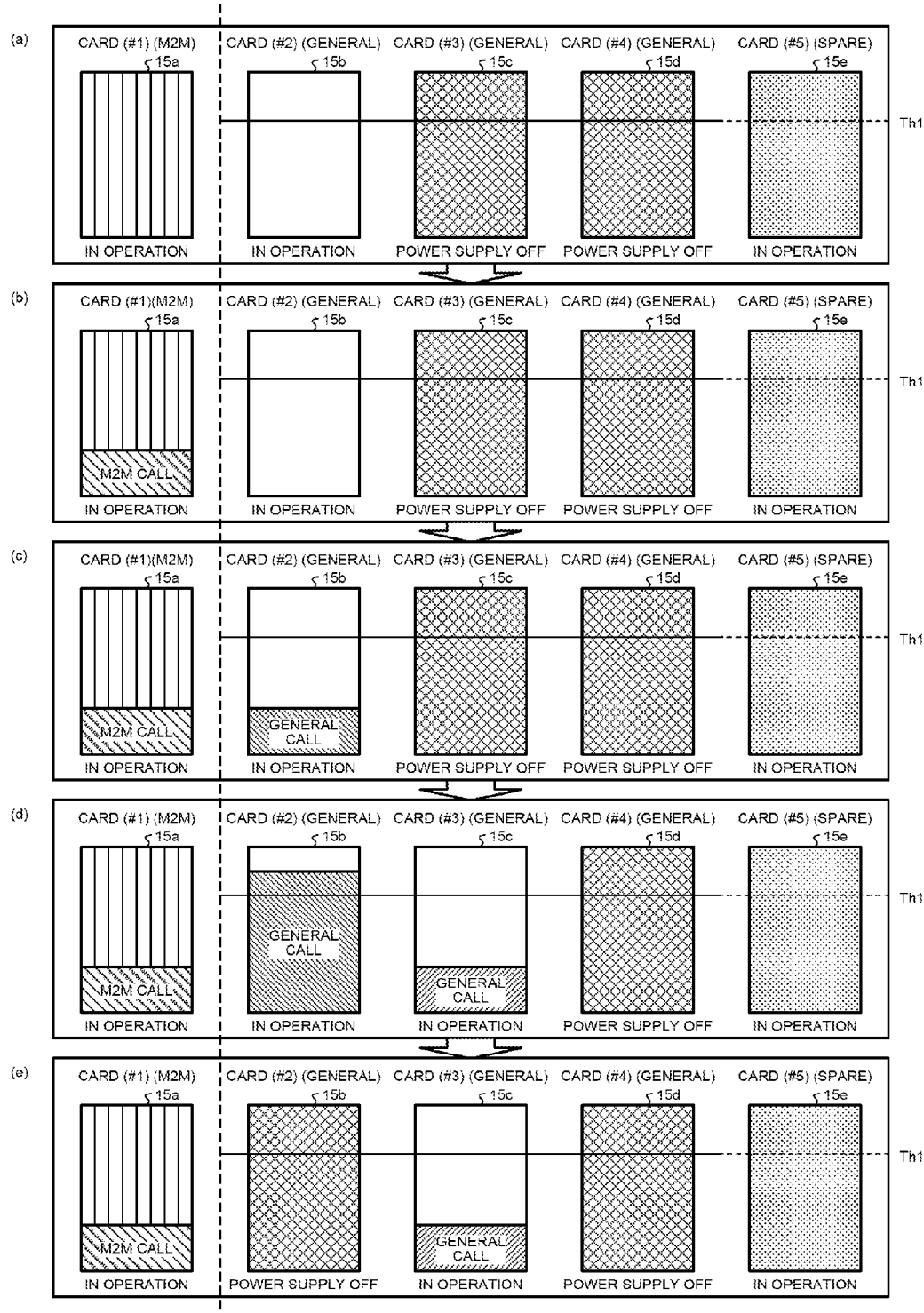
FIG. 5 is a schematic diagram illustrating an example of a call process according to the first embodiment.

FIG. 5 is a schematic diagram illustrating an example of a call process according to the first embodiment. In the example illustrated in FIG. 5, the card 15a is the M2M card, the cards 15b to 15d are the general cards, and the card 15e is the spare card. The order the general cards are started up is the order of the card 15b with the card number #2, the card 15c with the card number #3, the card 15d with the card number #4, and the card 15b of the card number #2, which is in rotation of the card numbers.

The state indicated by (a) illustrated in FIG. 5 indicates that the cards 15a, 15b, and 15e are in the operation state with the power supply being turned on and indicates that the cards 15c and 15d are in a state in which the power supply is shut off. In each of the cards 15b to 15d, Th1 that is the threshold of an amount of call to be processed is set. In the state indicated by (a) illustrated in FIG. 5, no call is allocated to the cards 15a to 15d. In the example illustrated by (a) in FIG. 5, because no call is allocated to the card 15b that is the general card, the power supply of the card 15b may also be shut off in the state in which no call is allocated.

Then, as indicated by (b) illustrated in FIG. 5, a new M2M call is allocated to the card 15a that is the M2M card. Then, as indicated by (c) illustrated in FIG. 5, a new general call is allocated to the card 15b that is the general card and that is in operation.

Then, as indicated by (d) illustrated in FIG. 5, if an amount of call of the general call that is being processed in the card 15b reaches a predetermined threshold due to the new general call being allocated to the card 15b, the card 15c that is the general card and that is subsequent to the card 15b is started up. Then, after the completion of the startup of the card 15c, the new general call is allocated to the card 15c. Thereafter, if an amount of call of the general call that is being processed in the card 15b after the end of the call process of the general call in the card 15b reaches zero, the power supply of the card 15b is shut off.

Advantage of the First Embodiment

In the first embodiment, by considering a characteristic of the M2M call in which a call process in the card is ended in a short time after a lot of calls simultaneously occur, the M2M card dedicated to an M2M call is provided and the M2M card is excluded from the target for power supply control of cards aiming at a reduction in electrical power consumption. Namely, by targeting only the general card as the power supply control of cards, the first embodiment can suppress the frequency of occurrence between an on state of the power supply of a card that is needed to be changed for allocation of a new general call and an off state of the power supply of a card in which an amount of call that is being processed becomes zero. Consequently, the first embodiment can enhance the effect of reducing the electrical power consumed in the base station device 10A.

[b] Second Embodiment

In a base station device 1A according to the first embodiment described above, the number of M2M cards is fixed; however, a base station device according to a second embodiment differs from the base station device 1A according to the first embodiment in that the number of M2M cards can vary on the basis of a predicted amount of the M2M call. Furthermore, in the base station device according to the second embodiment, the number of M2M cards may also be changed, on the basis of a predicted amount of the M2M call, in units of cards or in units of integer equal to or greater than two. Other points are similar to those in the first embodiment, and therefore, the descriptions thereof will be omitted.

Base Station Device According to the Second Embodiment

FIG. 6A is a block diagram illustrating an example of a base station device according to a second embodiment. FIG. 6A illustrates only the block related to the second embodiment from among blocks in a base station device 10B according to the second embodiment and other blocks are omitted. Furthermore, in the base station device 10B illustrated in FIG. 6A, the blocks having the same reference numerals as those in the base station device 10A illustrated in FIG. 1A have the same configuration or the similar functions as those in the base station device 10A illustrated in FIG. 1A except for the following points described below; therefore, descriptions thereof will be omitted.

As illustrated in FIG. 6A, a call processing unit 12B in the base station device 10B according to the second embodiment further includes a card count control unit 12d. As will be described later, the card count control unit 12d calculates an increase/decrease amount of a newly accepted M2M call per unit time and determines the number of M2M cards on the basis of an M2M call throughput predicted value T after a predetermined time that can be predicted from an increase/decrease amount per unit time. Then, from among the cards included in the signal processing unit 15, the card count control unit 12d allocates, to the M2M cards, the cards the number of which corresponds to the determined number of cards and allocates, to the general cards, the cards the number of which is obtained by subtracting the number of spare cards from the remaining cards. In the second embodiment, the card count control unit 12d allocates the cards the number of which is determined on the basis of the M2M call throughput predicted value T to the M2M cards in the ascending order starting from, for example, the card number #1.

Furthermore, a storing unit 13B in the base station device 10B further includes an M2M card count control table 13b1.

FIG. 6B is a schematic diagram illustrating an example of an M2M card count control table according to the second embodiment. As illustrated in FIG. 6B, the M2M card count control table 13b1 stores therein, in an associated manner, the "number of M2M cards" and the "range of the M2M call throughput predicted value T". The "number of M2M cards" is the number of cards allocated as the M2M cards. The "range of the M2M call throughput predicted value T" indicates the range that is related to the M2M call throughput predicted value T and that is associated with the "number of M2M cards".

For example, it is assumed that the card count control unit 12d calculates $0 \leq T < T1$ (T1 is a predetermined value) as the M2M call throughput predicted value T. In this case, the card count control unit 12d refers to the M2M card count control table 13b1 and acquires the "number of M2M cards" of "1" that is associated with "$0 \leq T < T1$" indicated by the "range of the M2M call throughput predicted value T". Namely, the card count control unit 12d performs control such that the card 15a is set as the M2M card and the cards 15b to 15d as the general cards. This also applies to the other "number of M2M cards" and the other "range of the M2M call throughput predicted value T" illustrated in FIG. 6B.

Flow of an M2M Card Count Control Process According to the Second Embodiment

FIG. 7 is a flowchart illustrating an example of an M2M card count control process according to the second embodiment. The M2M card count control process is performed every time a new M2M call is accepted by the base station device 10B. First, the card count control unit 12d accepts a new M2M call (Step S81). Then, the card count control unit 12d measures the throughput of the M2M call received at Step S81, associates the throughput of the measured M2M call with the measurement time, and records the associated information in a storing unit that is not illustrated (Step S82).

Then, the card count control unit 12d determines whether if it is the update timing of the number of M2M cards (Step S83). The update timing may also be a predetermined period or may also be performed when the throughput of the M2M call measured at Step S82 exceeds a predetermined threshold. If it is the update timing of the number of M2M cards (Yes at Step S83), the card count control unit 12d performs the process indicated at Step S84. In contrast, if it is not the update timing of the number of M2M cards (No at Step S83), the card count control unit 12d performs the process indicated by Step S81.

At Step S84, the card count control unit 12d calculates, on the basis of the throughput of the M2M call recorded in the storing unit that is not illustrated, an increase/decrease amount of the throughput of the M2M call per unit time. For example, the card count control unit 12d calculates, on the basis of the latest throughput of the predetermined time period from among the throughput of the M2M calls recorded in the storing unit that is not illustrated, an amount of change in the throughput per unit time as an increase/decrease amount of the throughput of the M2M call.

Then, the card count control unit 12d multiplies the predetermined time by the increase/decrease amount of the throughput of the M2M call per unit time calculated at Step S84 and calculates the M2M call throughput predicted value T after the predetermined time (Step S85). Then, the card count control unit 12d refers to the M2M card count control table 13b1 on the basis of the M2M call throughput predicted value T calculated at Step S85 and specifies the range of the M2M call throughput predicted value T that includes therein the M2M call throughput predicted value T calculated at Step S85. Then, the card count control unit 12d refers to the M2M card count control table 13b1 and specifies the number of M2M cards associated with the range of the specified M2M call throughput predicted value T (Step S86). Then, the card count control unit 12d changes the number of M2M cards on the basis of the M2M cards that are specified at Step S86 (Step S87). At Step S87, the card count control unit 12d allocates the number of cards that are associated with the number of M2M cards specified at Step S86 to the M2M card. After the end of the process at Step S87, the card count control unit 12d ends the M2M card count control process.

M2M Card Count Control Process According to the Second Embodiment

FIG. 8 is a schematic diagram illustrating an example of the M2M card count control process according to the second embodiment. The order of allocation of cards as the M2M card is in the order of the card 15b with the card number #2 and the card 15c of the card number #3. If a plurality of cards is started up as the M2M cards, the plurality of cards is started up in ascending order of the card numbers. Furthermore, the order of cards to be started up as the general cards is in the order of sequential cards with ascending order of the card numbers starting from the minimum card number and the card to be started up after the card with the maximum card number is the card with the minimum card number, which is in rotation of the card numbers.

The state indicated by (a) illustrated in FIG. 8 indicates that the card 15a is in the operation state as the M2M card, indicates that the cards 15b and 15d are in the off state of the power supply as the general cards, indicates that the card 15c is in the operation state as the general card, and indicates that the card 15e is in the operation state as the spare card. In each of the cards 15b to 15d, Th1 that is the threshold of the amount of call to be processed is set. Furthermore, in the state indicated by (a) illustrated in FIG. 8, no call is allocated to the cards 15a to 15d.

Then, as indicated by (b) illustrated in FIG. 8, a new M2M call is allocated to the card 15a that is the M2M card. Then, after the new M2M call is allocated to the M2M card and, at the update timing of the number of M2M cards, the number of M2M cards is changed from "1" to "2" on the basis of the M2M call throughput predicted value T. Consequently, as indicated by (c) illustrated in FIG. 8, the card 15b with the immediately subsequent number to that of the card 15a is started up and then the cards 15a and 15b become in the operation state as the M2M cards. Then, the card 15c becomes in the operation state as the general card and the card 15d becomes, as the general card, in the off state of the power supply.

Then, as indicates by (d) illustrated in FIG. 8, if the allocation of the M2M call to the card 15a reaches the maximum value of the amount of call that can be processed by the card 15a, a subsequent new M2M call is allocated to the card 15b.

Furthermore, when the card with the immediately subsequent number to that of the card 15a is started up as the M2M card, if the card 15b is in the operation state as the general card, the card with the minimum card number from among the cards that are in the off state of the power supply may also be started up and used as the M2M card.

Another Mode of the Second Embodiment

It is assumed that the base station device 10B according to the second embodiment can change the number of M2M cards on the basis of a predicted amount of the M2M call in units of, for example, a single M2M card. However, the number of M2M cards that can be changed on the basis of the predicted amount of the M2M call is not limited to the units of a single M2M card. The change may also be performed in units of two or more M2M cards or in units of one or less M2M card. In the following, when the number of M2M cards is changed on the basis of a predicted amount of the M2M call in units of one or less M2M card will be described as another mode of the second embodiment. In the other mode of the second embodiment, it is assumed that the base station device 10B can change the number of M2M cards on the basis of a predicted amount of the M2M call in units of one or less M2M card, for example, in units of 0.5 M2M card. Furthermore, the number of M2M cards that can be changed on the basis of the predicted amount of the M2M call is not limited to the units of 0.5 M2M card but the design may be appropriately changed as long as the number of M2M cards is changed in units of one or less M2M card. Other points are similar to those in the second embodiment, and therefore, the descriptions thereof will be omitted.

The storing unit 13B in the base station device 10B further includes an M2M card count control table 13b2 instead of the M2M card count control table 13b1.

FIG. 9 is a schematic diagram illustrating an example of an M2M card count control table according to another embodiment of the second embodiment. As illustrated in FIG. 9, the M2M card count control table 13b2 stores therein, in an associated manner, the "limited amount", the "number of M2M cards", and the "range of the M2M call throughput predicted value T". The "limited amount" indicates that, from among the cards that are associated as the M2M cards, the number of cards that can be allocated to the process of the M2M call. In other words, the "limited amount" is the ratio of the number of cards that can be allocated to the process of the M2M call to the number of cards that have been allocated as the M2M card. In the example illustrated in FIG. 9, the "limited amount" is the value equal to or less than the "number of M2M cards". For example, as illustrated in FIG. 9, if the "number of M2M cards" is "1", when the "limited amount" is 0.5, half of the card out of a single card is allocated to the M2M card and the remaining half of the card is allocated to the general card. Furthermore, for example, as illustrated in FIG. 9, if the "number of M2M cards" is "2", when the "limited amount" is 1.5, a single card out of two cards and half of another single card are allocated to the M2M card and the remaining half of the other single card is allocated to the general card.

For example, it is assumed that the card count control unit 12d calculates 0T<0.5×T1 (T1 is a predetermined value) as the M2M call throughput predicted value T. In this case, the card count control unit 12d refers to the M2M card count control table 13b2 and acquires the "limited amount" of "0.5" and the "number of M2M cards" of "0.5" that are associated with the "range of the M2M call throughput predicted value T" of "0≤T<0.5×T1". Then, the card count control unit 12d allocates the half of the card 15a to the M2M card and allocates the remaining half of the card 15a and the cards 15b to 15d as the general card.

Furthermore, for example, it is assumed that the card count control unit 12d calculates 0.5×T1≤T<T1 as the M2M call throughput predicted value T. In this case, the card count control unit 12d refers to the M2M card count control table 13b2 and acquires the "limited amount" of "1" and the "number of M2M cards" of "1" that are associated with the "range of the M2M call throughput predicted value T" of "0.5×T1≤T<T1". Then, the card count control unit 12d allocates the card 15a to the M2M card and allocates the cards 15b to 15d to the general cards. This also applies to the other "limited amount" the "number of M2M cards" and the other "range of the M2M call throughput predicted value T" illustrated in FIG. 9.

Furthermore, the "limited amount" and the "number of M2M cards" associated with the "range of the M2M call throughput predicted value T" may also be appropriately determined, instead of in units of 0.5 M2M card, in accordance with the "range of the M2M call throughput predicted value T".

Figure 10:
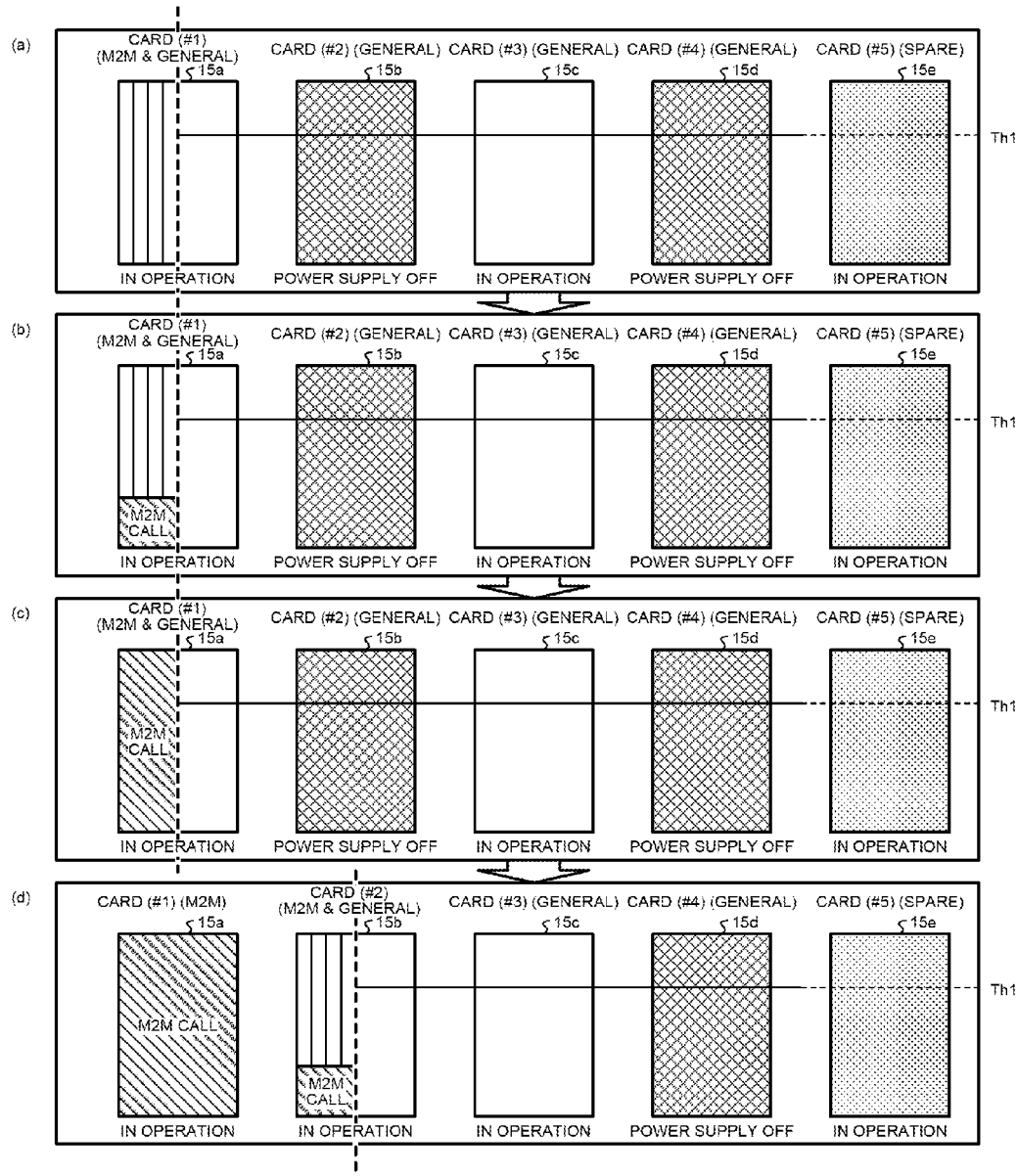
FIG. 10 is a schematic diagram illustrating an example of an M2M card count control process according to another embodiment of the second embodiment.

M2M Card Count Control Process According to the Other Mode in the Second Embodiment FIG. 10 is a schematic diagram illustrating an example of an M2M card count control process according to another embodiment of the second embodiment. The state indicated by (a) illustrated in FIG. 10 indicates that half of the card 15a is in the operation state as the M2M card and indicates that the cards 15b and 15d are in the off state of the power supply as the general card. Furthermore, the state indicated by (a) illustrated in FIG. 10 indicates that half of the card 15a and the entirety of the card 15c are in the operation state as the general cards and indicates that the card 15e is in the operation state as the spare card. In each half of the card 15a and the cards 15b to 15d, Th1 that is the threshold of the amount of call to be processed is set. Furthermore, in the state indicated by (a) illustrated in FIG. 10, no call is allocated to the cards 15a to 15d.

Then, as indicated by (b) illustrated in FIG. 10, a new M2M call is allocated to the card 15a that is the M2M card. Then, as indicated by (c) illustrated in FIG. 10, the new M2M call is allocated to the M2M card within the range of the limited amount (the half in the example indicated by (c) illustrated in FIG. 10). Then, at the update timing of the number of M2M cards, on the basis of the M2M call throughput predicted value T, the limited amount and the number of M2M cards are changed from "0.5" to "1.5". Then, as indicated by (d) illustrated in FIG. 10, the card 15b with the immediately subsequent number to that of the card 15a is started up. Then, as indicated by (d) illustrated in FIG. 10, the card 15a and half of the card 15b become in the operation state as the M2M cards, the card 15c becomes in the operation state as the general card, and the card 15d becomes in the off state of the power supply as the general card.

Then, as indicated by (d) illustrated in FIG. 10, if the allocation of the M2M call to the card 15a reaches the maximum value of the amount of call that can be processed by the card 15a, a subsequent new M2M call is allocated to the card 15b by an amount up to half of the maximum value of the amount of call that can be processed by the card 15b.

Furthermore, when the card with the immediately subsequent number to that of the card 15a is started up as the M2M card, if the card 15b is in the operation state as the general card, the card with the minimum card number from among the cards that are in the off state of the power supply may also be started up and used as the M2M card.

Furthermore, in the second embodiment and in the other mode of the second embodiment, the number of M2M cards is determined in accordance with the M2M call throughput predicted value T; however, the disclosed technology is not limited to this. The number of M2M cards may also be determined in accordance with the actual measurement value of the throughput of the M2M call.

Advantage of the Second Embodiment

In the second embodiment and in the other mode of the second embodiment, the number of M2M cards can be changed in accordance with the predicted amount of the M2M call. Namely, in the second embodiment and in the other mode of the second embodiment, the number of general cards that is targeted for the control of the power supply and the number of M2M cards that is not targeted for the control of the power supply can be finely controlled. Thus, the second embodiment and the other mode of the second embodiment can allocate, if an amount of M2M call that is being processed is small, fewer cards to the M2M card and thus can reduce the number of cards in each of which the power supply is always applied. Consequently, in accordance with the state of the occurrence of the M2M call, it is possible to more efficiently implement a reduction in electrical power consumed in the base station device 10B.

[c] Third Embodiment

In a third embodiment, the base station device can change the number of M2M cards on the basis of a predicted amount of the M2M call in units of one or less M2M card (for example, in units of 0.5 M2M cards). Then, in the third embodiment, when the base station device allocates a new general call to a card, if an amount of call of the general call that is being processed in the general card that is in the operation state reaches a predetermined threshold and the general card with the immediately subsequent number is not able to be allocated, a new general call is allocated to another card in accordance with the state. Furthermore, in the third embodiment, it is assumed that the base station device can change the number of M2M cards on the basis of a predicted amount of the M2M call in units of 0.5 cards; however, the change is not limited to the units of 0.5 M2M card but the design may be appropriately changed such that any units may be used for the change. Other points are similar to those in the second embodiment, and therefore, the descriptions thereof will be omitted.

Base Station Device According to the Third Embodiment

Figure 11:
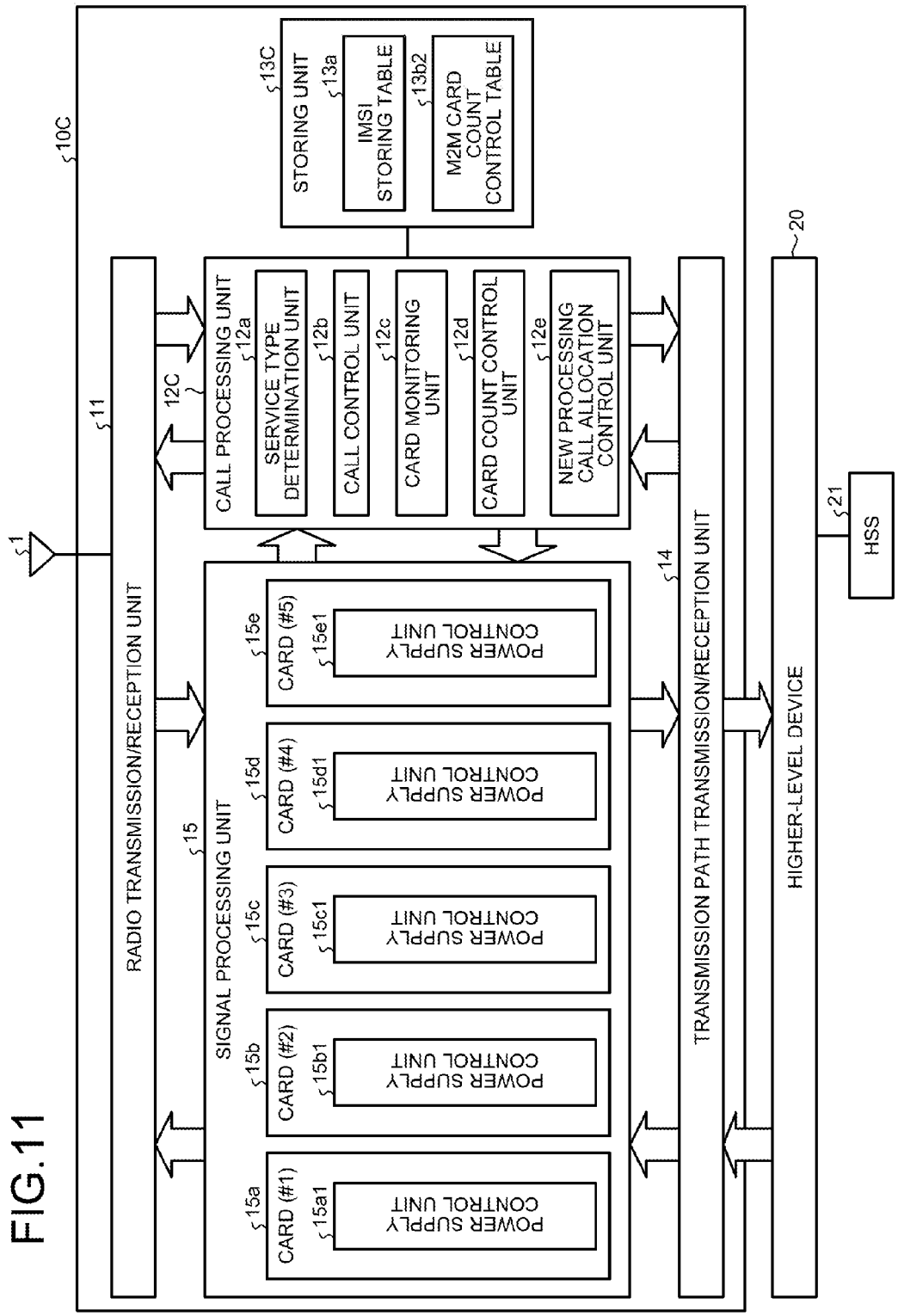
FIG. 11 is a block diagram illustrating an example of a base station device according to a third embodiment.

FIG. 11 is a block diagram illustrating an example of a base station device according to a third embodiment. FIG. 11 illustrates only the block related to the third embodiment from among blocks in a base station device 10C according to the third embodiment and other blocks are omitted. Furthermore, in the base station device 10C illustrated in FIG. 11, the blocks having the same reference numerals as those in the base station device 10B illustrated in FIG. 6A have the same configuration or the similar functions as those in the base station device 10B illustrated in FIG. 6A except for the following points described below; therefore, descriptions thereof will be omitted.

As illustrated in FIG. 11, a call processing unit 12C in the base station device 10C according to the third embodiment further includes a new processing call allocation control unit 12e. When the new processing call allocation control unit 12e allocates a new general call to a card, if an amount of call of the general call that is being processed in the general card that is in the operation state reaches a predetermined threshold and the new general call is not able to be allocated to the general card with the immediately subsequent number, the new processing call allocation control unit 12e allocates the new general call to another card. The case in which a new general call is not able to be allocated to the general card with the immediately subsequent number is a case in which, for example, the general card with the immediately subsequent number is not in operation. Furthermore, the new processing call allocation control unit 12e may also be integrated with the call control unit 12b and, furthermore, the process performed by the new processing call allocation control unit 12e, which will be described later, may also be performed by the call control unit 12b. Furthermore, a storing unit 13C in the base station device 10C is the same as the storing unit 13B in the base station device 10B described in the second embodiment.

Flow of a Call Allocation Process According to the Third Embodiment

Figure 12:
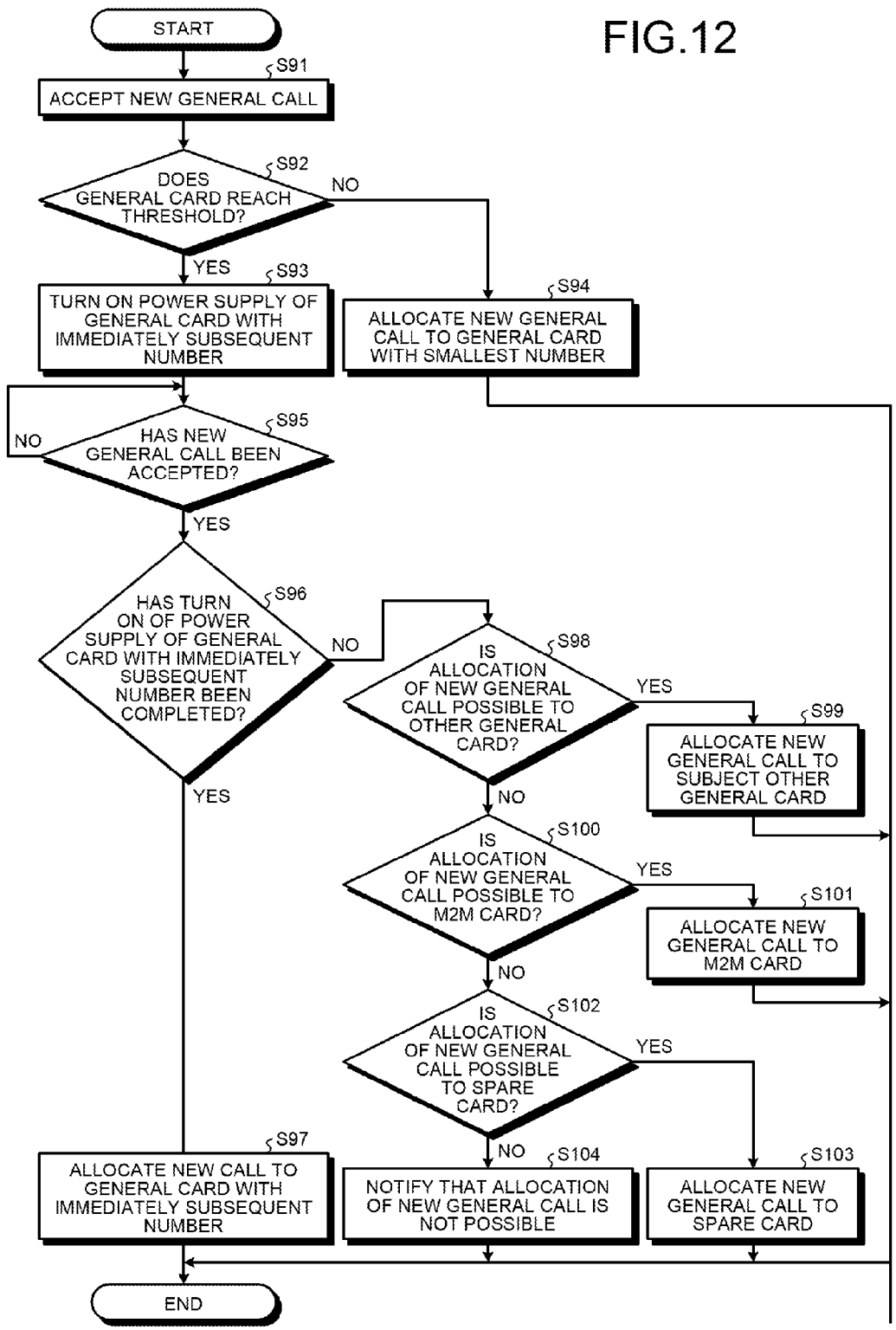
FIG. 12 is a flowchart illustrating an example of a call allocation process according to the third embodiment.

FIG. 12 is a flowchart illustrating an example of a call allocation process according to the third embodiment. The call allocation process is performed every time when, for example, a new general call is accepted by the base station device 10C. As illustrated in FIG. 12, first, the new processing call allocation control unit 12e accepts a new general call (Step S91). Then, the new processing call allocation control unit 12e determines whether an amount of call that is being processed in the general card that is in operation reaches a predetermined threshold (Step S92). If an amount of call that is being processed in the general card that is in operation reaches a predetermined threshold (Yes at Step S92), the new processing call allocation control unit 12e performs the process indicated at Step S93. In contrast, if an amount of call that is being processed in the general card that is in operation does not reach a predetermined threshold (No at Step S92), the new processing call allocation control unit 12e moves the process to Step S94.

At Step S93, the new processing call allocation control unit 12e applies the power supply of the general card with the immediately subsequent number. In contrast, at Step S94, the new processing call allocation control unit 12e allocates the new general call accepted at Step S91 to the general card with the smallest number. After the end of the process at Step S94, the new processing call allocation control unit 12e ends the call process.

After the process at Step S93, at Step S95, the new processing call allocation control unit 12e determines whether a new general call has been accepted. If a new general call has been accepted (Yes at Step S95), the new processing call allocation control unit 12e performs the process indicated at Step S96. In contrast, if a new general call has not been accepted (No at Step S95), the new processing call allocation control unit 12e repeatedly performs the process indicated at Step S95. At Step S96, the new processing call allocation control unit 12e determines whether a turn on the power supply of the general card with the immediately subsequent number to that of the general card in which the power supply was applied at Step S93 has been completed. If a turn on the power supply of the general card with the immediately subsequent number to that of the general card in which the power supply was applied at Step S93 has been completed (Yes at Step S96), the new processing call allocation control unit 12e performs the process indicated at Step S97. In contrast, if a turn on the power supply of the general card with the immediately subsequent number to that of the general card in which the power supply was applied at Step S93 has not been completed (No at Step S96), the new processing call allocation control unit 12e performs the process indicated at Step S98.

At Step S97, the new processing call allocation control unit 12e allocates the new general call accepted at Step S95 to the general card that has the immediately subsequent number and that is determined that the turn on the power supply has been completed at Step S96. After the end of the process at Step S97, the new processing call allocation control unit 12e ends the call allocation process.

In contrast, at Step S98, the new processing call allocation control unit 12e determines whether allocation of new general call accepted at Step S95 to the other general card is possible. If the allocation of new general call accepted at Step S95 to the other general card is possible (Yes at Step S98), the new processing call allocation control unit 12e performs the process indicated at Step S99. In contrast, if the allocation of new general call accepted at Step S95 to the other general card is not possible (No at Step S98), the new processing call allocation control unit 12e performs the process indicated at Step S100.

At Step S99, the new processing call allocation control unit 12e allocates the new general call accepted at Step S95 to the other general card in which the allocation is possible. After the end of the process at Step S99, the new processing call allocation control unit 12e ends the call allocation process.

In contrast, at Step S100, the new processing call allocation control unit 12e determines whether the allocation of the new general call accepted at Step S95 to the M2M card is possible. If the allocation of the new general call accepted at Step S95 to the M2M card is possible (Yes at Step S100), the new processing call allocation control unit 12e performs the process indicated at Step S101. In contrast, if the allocation of the new general call accepted at Step S95 to the M2M card is not possible (No at Step S100), the new processing call allocation control unit 12e performs the process indicated at Step S102.

At Step S101, the new processing call allocation control unit 12e allocates the new general call accepted at Step S95 to the M2M card in which the allocation is possible. After the end of the process at Step S101, the new processing call allocation control unit 12e ends the call allocation process.

In contrast, at Step S102, the new processing call allocation control unit 12e determines whether the allocation of the new general call accepted at Step S95 to the spare card is possible. If the allocation of the new general call accepted at Step S95 to the spare card is possible (Yes at Step S102), the new processing call allocation control unit 12e performs the process indicated at Step S103. In contrast, if the allocation of the new general call accepted at Step S95 to the spare card is not possible (No at Step S102), the new processing call allocation control unit 12e performs the process indicated at Step S104.

At Step S103, the new processing call allocation control unit 12e allocates the new general call accepted at Step S95 to the spare card in which the allocation is possible. If the process at Step S103 is ended, the new processing call allocation control unit 12e ends the call allocation process. In contrast, at Step S104, the new processing call allocation control unit 12e outputs a notification of disable of new general call allocation indicating that there is no card that can be used to allocate a new general call accepted at Step S95 to, for example, a console terminal that is not illustrated. After the end of the process at Step S104, the new processing call allocation control unit 12e ends the call allocation process.

Call Allocation Process According to the Third Embodiment

Figure 13A:
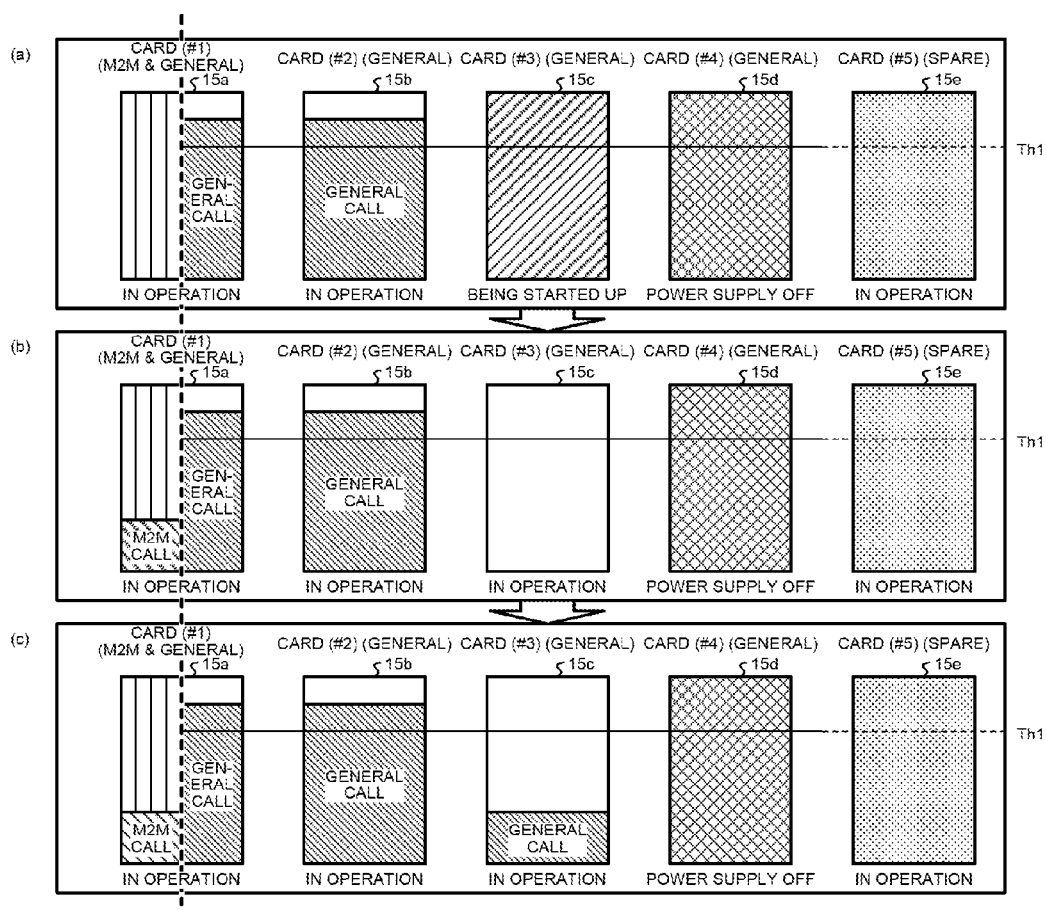
FIG. 13A is a schematic diagram illustrating an example of a call allocation process according to the third embodiment.

FIG. 13A is a schematic diagram illustrating an example of a call allocation process according to the third embodiment. FIG. 13A illustrates the process performed when, at the steps illustrated in FIG. 12, an application of the power supply of the general card with the immediately subsequent has been completed (Yes at Step S96). The state indicated by (a) illustrated in FIG. 13A indicates that half of the card 15a is in the operation state as the M2M card and indicates that half of the card 15a and the card 15b are in the operation state as the general cards. Furthermore, the state indicated by (a) illustrated in FIG. 13A indicates that the card 15c is being started up as the general card, indicates that the card 15d is in the off state of the power supply as the general card, and indicates that the card 15e is in the operation state as the spare card. In half of the card 15a and in the cards 15b to 15d, Th1 that is the threshold of the amount of call is set. Furthermore, in the state indicated by (a) illustrated in FIG. 13A, the general call that exceeds the threshold Th1 is allocated to the half of the card 15a and the card 15b.

Then, as indicated by (b) illustrated in FIG. 13A, the card 15c has been started up as the general card and becomes in operation. Then, as indicated by (c) illustrated in FIG. 13A, the new general call is allocated to the card 15c that is the general card.

Figure 13B:
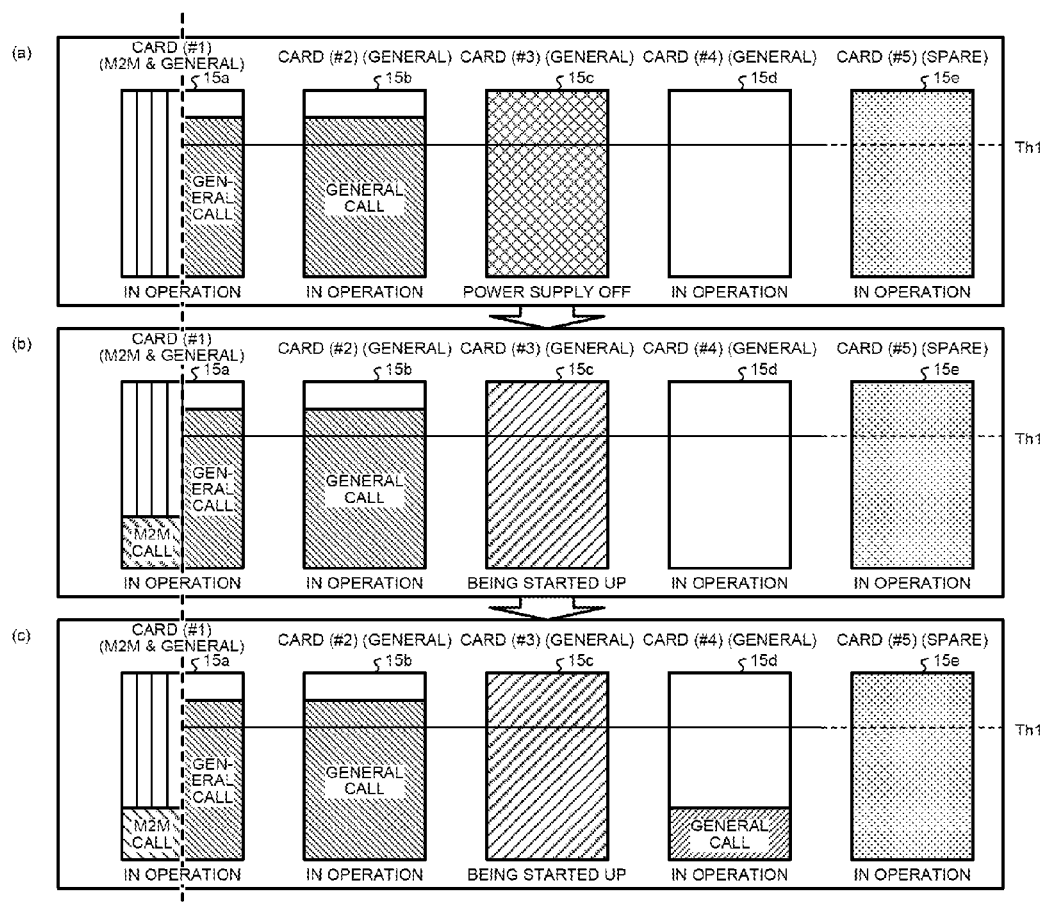
FIG. 13B is a schematic diagram illustrating an example of the call allocation process according to the third embodiment.

FIG. 13B is a schematic diagram illustrating an example of the call allocation process according to the third embodiment. FIG. 13B indicates the process performed when, at Step S98 illustrated in FIG. 12, the allocation to a new general call to the other general card is possible (Yes at Step S98). The state indicated by (a) illustrated in FIG. 13B indicates that half of the card 15a is in the operation state as the M2M card and indicates that the card 15b is in the operation state as the general card. Furthermore, the state indicated by (a) illustrated in FIG. 13B indicates that the card 15c is the state in which the power supply is shut off as the general card, indicates that the card 15d is in the operation state as the general card, and indicates that the card 15e is in the operation state as the spare card. In each of half of the card 15a and in the cards 15b to 15d, Th1 that is the threshold of the amount of call to be processed is set. Then, in the state indicated by (a) illustrated in FIG. 13B, the general call that exceeds the threshold Th1 is allocated to each of the half of the card 15a and the card 15b.

Then, as indicated by (b) and (c) illustrated in FIG. 13B, the card 15c is still being started up as the general card. Consequently, as indicated by (c) illustrated in FIG. 13B, a new general call is allocated to the card 15d with the smallest card number from among the general cards that are in operation.

Figure 13C:
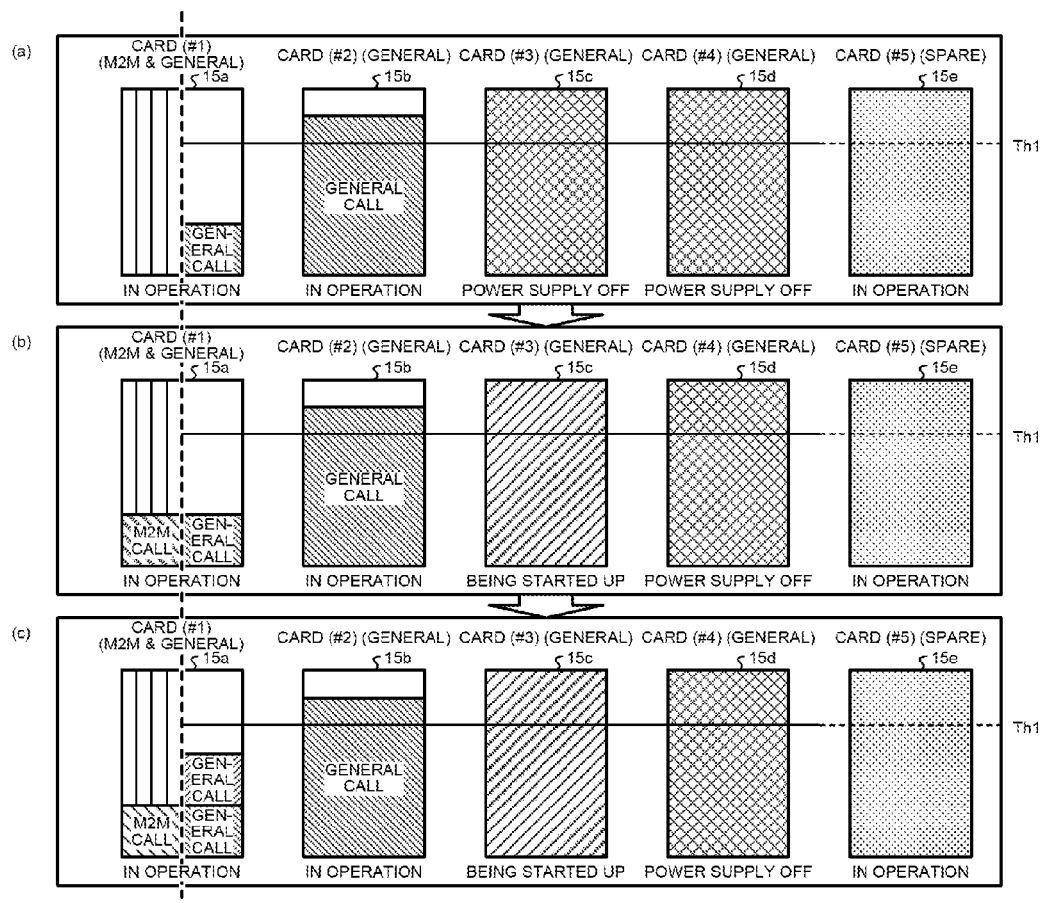
FIG. 13C is a schematic diagram illustrating an example of the call allocation process according to the third embodiment.

Furthermore, FIG. 13C is a schematic diagram illustrating an example of the call allocation process according to the third embodiment. FIG. 13B indicates the process performed when, at Step S100 illustrated in FIG. 12, allocation of new general call is possible to the M2M card (Yes at Step S100). The state indicated by (a) illustrated in FIG. 13C indicates that half of the card 15a is in the operation state as the M2M card and indicates that the remaining half of the card 15a and the card 15b are in the operation state as the general cards. Furthermore, the state indicated by (a) illustrated in FIG. 13C indicates that the cards 15c and 15d are in the off state of the power supply as the general cards and indicates that the card 15e is in the operation state as the pare card. In the half of the card 15a and in the cards 15b to 15d, Th1 that is the threshold of an amount of call to be processed is set. Furthermore, in the stated indicated by (a) illustrated in FIG. 13C, the general call that exceeds the threshold Th1 is allocated to the card 15b.

Then, as indicated by (b) illustrated in FIG. 13C, the card 15c is started up as the general card; however, as indicated by (c) illustrated in FIG. 13C, the card 15c is still being started up. Consequently, as indicated by (c) illustrated in FIG. 13C, from among the cards in operation, the new general call is allocated to the general card area in the card 15a in which half of the card 15a is allocated to the M2M card and the other half of the card 15a is allocated to the general card.

Figure 13D:
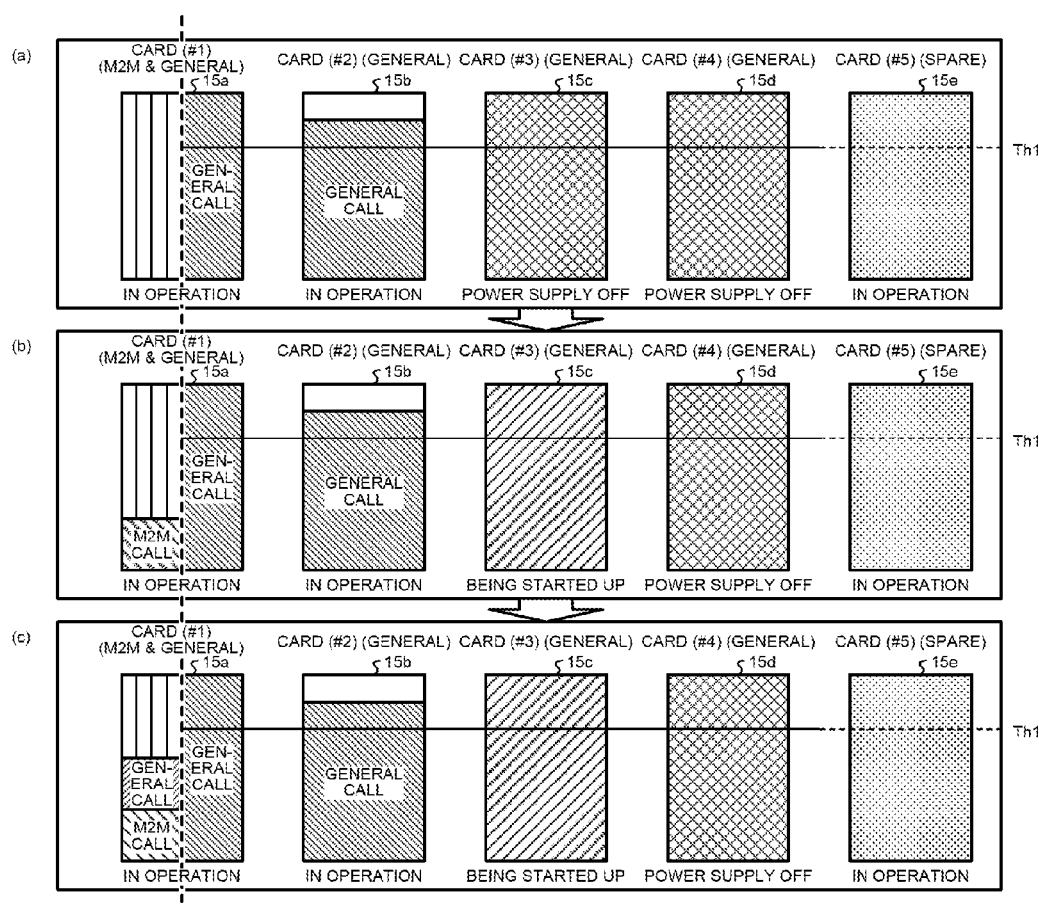
FIG. 13D is a schematic diagram illustrating an example of the call allocation process according to the third embodiment.

Furthermore, FIG. 13D is a schematic diagram illustrating an example of the call allocation process according to the third embodiment. FIG. 13D indicates the process performed when, at Step S100 illustrated in FIG. 12, the allocation of a new general call to the M2M card is possible (Yes at Step S100). The state indicated by (a) illustrated in FIG. 13D indicates that half of the card 15a is in the operation state as the M2M card and indicates that the remaining half of the card 15a and the card 15b are in the operation state as the general cards. Furthermore, the state indicated by (a) illustrated in FIG. 13D indicates that the cards 15c and 15d are in the off state of the power supply as the general card and indicates that the card 15e is in the operation state as the spare card. In the half of the card 15a and in the cards 15b to 15d, Th1 that is the threshold of an amount of call to be processed is set. Furthermore, in the state indicated by (a) illustrated in FIG. 13D, the general call is allocated to the card 15a by an amount up to the maximum value of the amount of call that can be processed. Furthermore, in the state indicated by (a) illustrated in FIG. 13D, the general call that exceeds Th1 that is the threshold of an amount of call to be processed is allocated to the card 15b.

Then, as indicated by (b) illustrated in FIG. 13D, the card 15c is started up as the general card; however, as indicated by (c) illustrated in FIG. 13D, the card 15c is still being started up. Thus, as indicated by (c) illustrated in FIG. 13D, from among the cards in operation, a new general call is allocated to the M2M card area of the card 15a in which half thereof is allocated to the M2M card and the other half thereof is allocated to the general card.

Figure 13E:
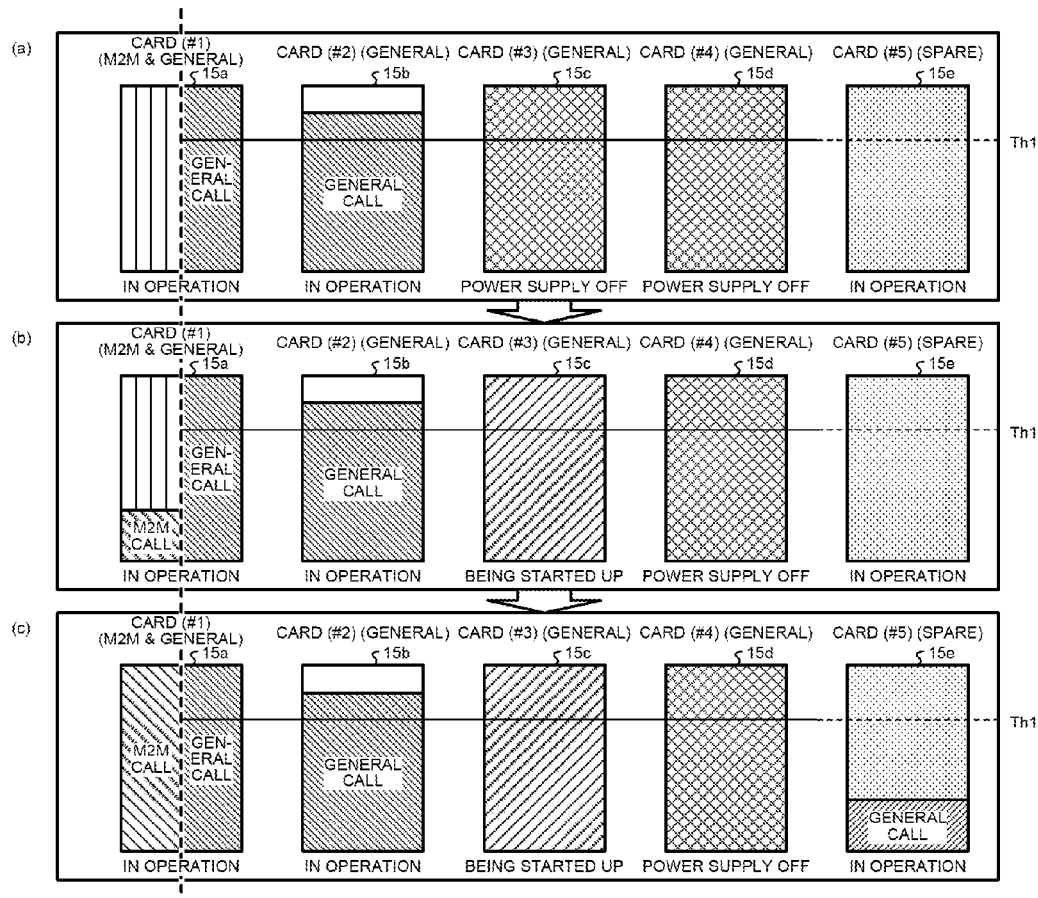
FIG. 13E is a schematic diagram illustrating an example of the call allocation process according to the third embodiment.

Furthermore, FIG. 13E is a schematic diagram illustrating an example of the call allocation process according to the third embodiment. FIG. 13E indicates the process performed when, at Step S102 illustrated in FIG. 12, the allocation of a new general call to the spare card is possible (Yes at Step S102). The state indicated by (a) illustrated in FIG. 13E indicates that half of the card 15a is in the operation state as the M2M card and indicates that the card 15b is in the operation state as the general card. Furthermore, the state indicated by (a) illustrated in FIG. 13E indicates that the cards 15c and 15d are in the off state of the power supply as the general card and indicates that the card 15e is in the operation state as the spare card. In the half of the card 15a and in the cards 15b to 15d, Th1 that is the threshold of amount of call to be processes is set. Furthermore, in the state indicated by (a) illustrated in FIG. 13E, the general call is allocated to the card 15a by an amount up to the maximum value of an amount of call that can be processed and the general call that exceeds the threshold Th1 is allocated to the card 15b.

Then, as indicated by (b) illustrated in FIG. 13E, the card 15c is started up as the general card; however, as indicated by (c) illustrated in FIG. 13E, the card 15c is still being started up. Furthermore, as indicated by (c) illustrated in FIG. 13E, in the M2M card area that corresponds to half of the card 15a, the M2M call is allocated by an amount up to the maximum value of the amount of call that can be processed. Thus, a new general call is allocated to the card 15e that is in operation and that is allocated as the spare card.

Furthermore, in the third embodiment, when a new general call is not able to be allocated to the general card, the new general call is allocated to the M2M card or the spare card. However, the disclosed technology is not limited to this. When a new M2M call is not able to be allocated to the M2M card, the new M2M call may also be allocated to the spare card. For example, if the new M2M call reaches the maximum value of the amount of call that can be processed by the M2M card and a process of changing the number of M2M cards does not meet the allocation of the new M2M call, the new M2M call may also be allocated to the spare card.

Advantage of the Third Embodiment

In the third embodiment, regarding the allocation of the general call, if the general call that exceeds the threshold Th1 is allocated to the general card that is in operation and if the completion of a startup of the other general card does not meet the allocation of a general call, a new general call is allocated to the M2M card or the spare card. Consequently, the third embodiment can reduce a call loss of the general call while efficiently reducing, by using the M2M card, the electrical power consumed in the base station device 10C.

[d] Fourth Embodiment

In a fourth embodiment, a base station device moves general calls that are being subjected to call process by a plurality of general cards to one or more general cards and collectively performs the call processes in the general cards at the move destination. Furthermore, because the fourth embodiment is the same as the first embodiment, except that general calls that are being subjected to call processes by a plurality of general cards are moved to one or more general cards and are collectively subjected to the call processes in the general cards at the move destination, description thereof will be omitted.

Base Station Device According to the Fourth Embodiment

Figure 14:
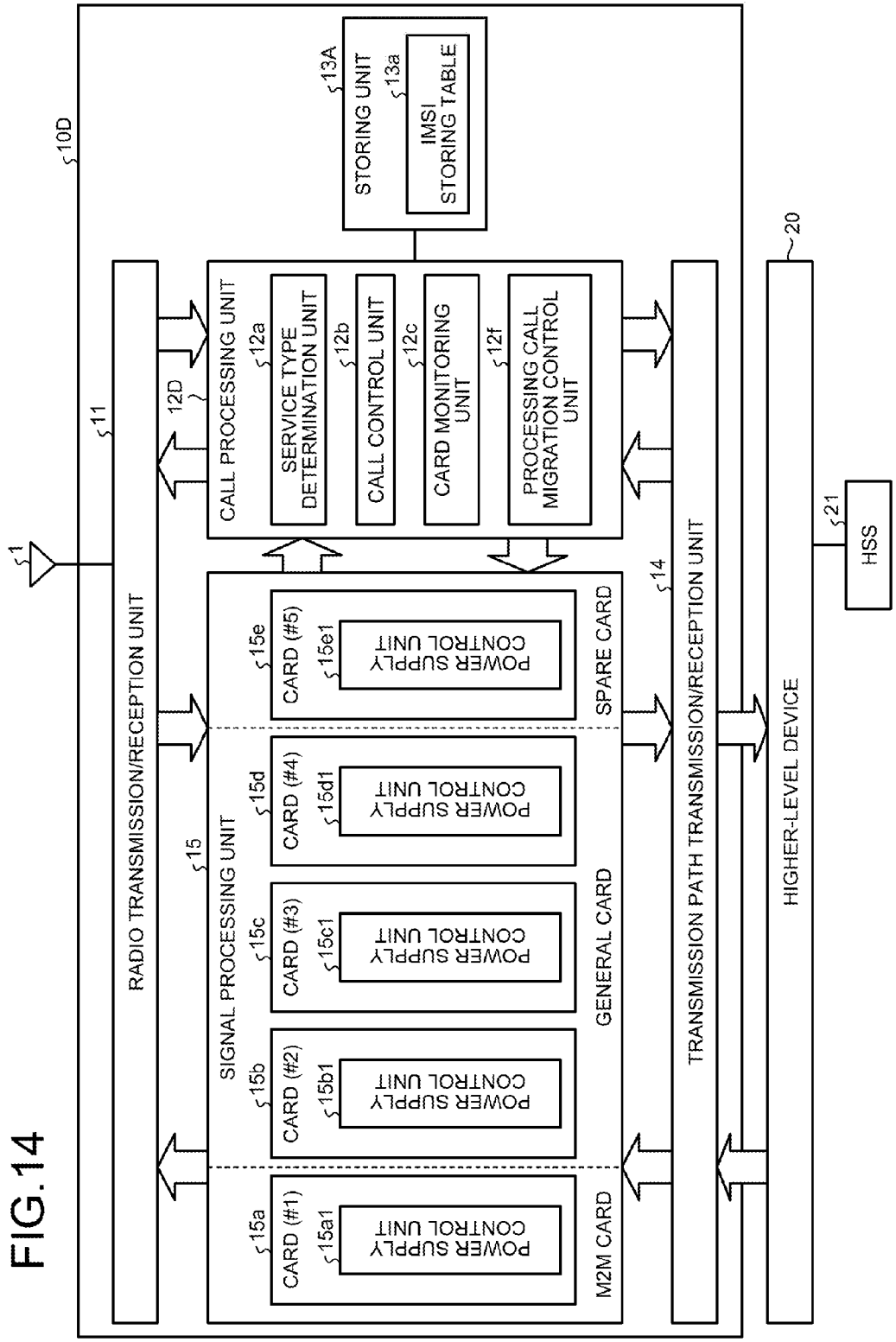
FIG. 14 is a block diagram illustrating an example of a base station device according to a fourth embodiment.

FIG. 14 is a block diagram illustrating an example of a base station device according to a fourth embodiment. FIG. 14 illustrates only the block related to the fourth embodiment from among blocks in a base station device 10D according to the fourth embodiment and other blocks are omitted. Furthermore, in the base station device 10D illustrated in FIG. 14, the blocks having the same reference numerals as those in the base station device 10A illustrated in FIG. 1A have the same configuration or the similar functions as those in the base station device 10A illustrated in FIG. 1A except for the following points described below; therefore, descriptions thereof will be omitted.

As illustrated in FIG. 14, a call processing unit 12D in the base station device 10D according to the fourth embodiment further includes a processing call migration control unit 12f. As will be described later, the processing call migration control unit 12f moves general calls that are being processed by a plurality of general card to one or more general cards and allow the general cards at the move destination to collectively perform processes.

Flow of a Processing Call Transfer Process According to the Fourth Embodiment

Figure 15:
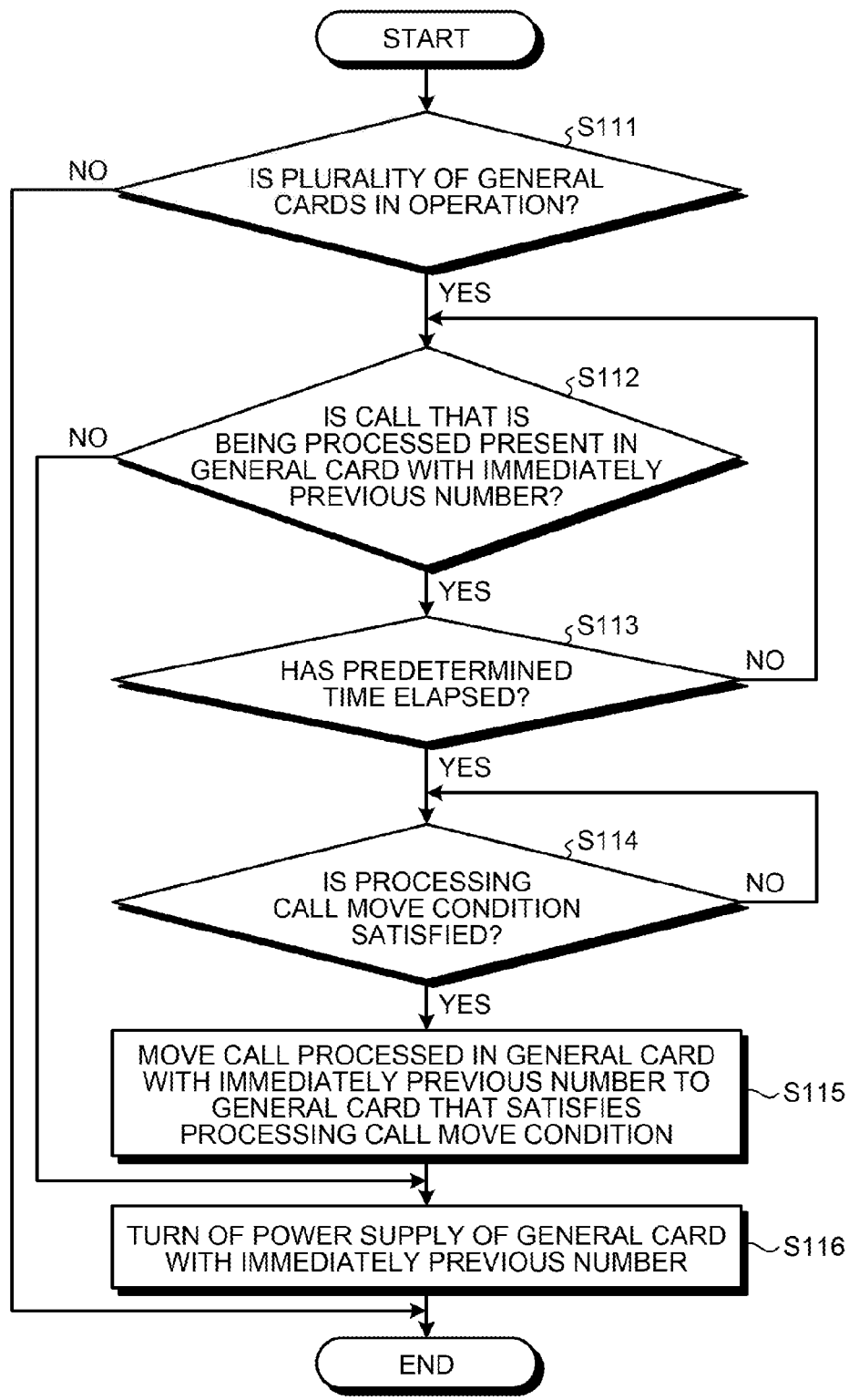
FIG. 15 is a flowchart illustrating an example of a processing call transfer process according to the fourth embodiment.

FIG. 15 is a flowchart illustrating an example of a processing call transfer process according to the fourth embodiment. The processing call transfer process may also be periodically performed or may also be performed every time a plurality of general cards that are in operation is detected.

First, the processing call migration control unit 12f determines whether a plurality of general cards is in operation (Step S111). If the plurality of general cards is in operation (Yes at Step S111), the processing call migration control unit 12f performs the process indicated at Step S112. In contrast, if the plurality of general cards is not in operation (No at Step S111), the processing call migration control unit 12f ends the processing call transfer process.

At Step S112, the processing call migration control unit 12f determines whether a call that is being processed is present in an immediately previous number general card that is the general card with the immediately previous number. The "immediately previous number general card" mentioned here is, for example, from among the general cards, the general card in which the power supply is applied and a startup has been completed the last time, i.e., immediately previous to, the general card in which the power supply is applied and a startup has been completed this time. In other words, the order of the startup of the "immediately previous number general card" is the general card that is started up immediately previously. If a call that is being processed is present in an immediately previous number general card (Yes Step S112), the processing call migration control unit 12f performs the process indicated at Step S113. In contrast, if no call that is being processed is present in the immediately previous number general card (No at Step S112), the processing call migration control unit 12f performs the process indicated at Step S116.

At Step S113, the processing call migration control unit 12f determines whether a predetermined time has elapsed. Furthermore, at Step S113, the reason for the processing call migration control unit 12f waiting for the predetermined time is to wait the end of a process of at least one call from among the calls that are being processed in the immediately previous number general card. If the predetermined time has elapsed (Yes at Step S113), the processing call migration control unit 12f performs the process indicated by Step S114. In contrast, if the predetermined time has not elapsed (No at Step S113), the processing call migration control unit 12f performs the process indicated by Step S112.

At Step S114, the processing call migration control unit 12f determines whether a processing call move condition is satisfied. The "processing call move condition" mentioned here is, due to a move of a call to be processed, an amount of all the calls to be processed in the general card at the move destination becomes less than a predetermined threshold. If the processing call move condition is satisfied (Yes at Step S114), the processing call migration control unit 12f performs the process indicated by Step S115. In contrast, if the processing call move condition is not satisfied (No at Step S114), the processing call migration control unit 12f performs the process indicated by Step S114.

At Step S115, the processing call migration control unit 12f moves the call processed in the immediately previous number general card to the general card that satisfies the processing call move condition. Then, the processing call migration control unit 12f shuts off the power supply of the immediately previous number general card, in which the call that is being subjected to the call process becomes zero due to a move of the call to be processed (Step S116). After the end of the process at Step S116, the processing call migration control unit 12f ends the processing call transfer process.

Processing Call Transfer Process According to the Fourth Embodiment

Figure 16A:
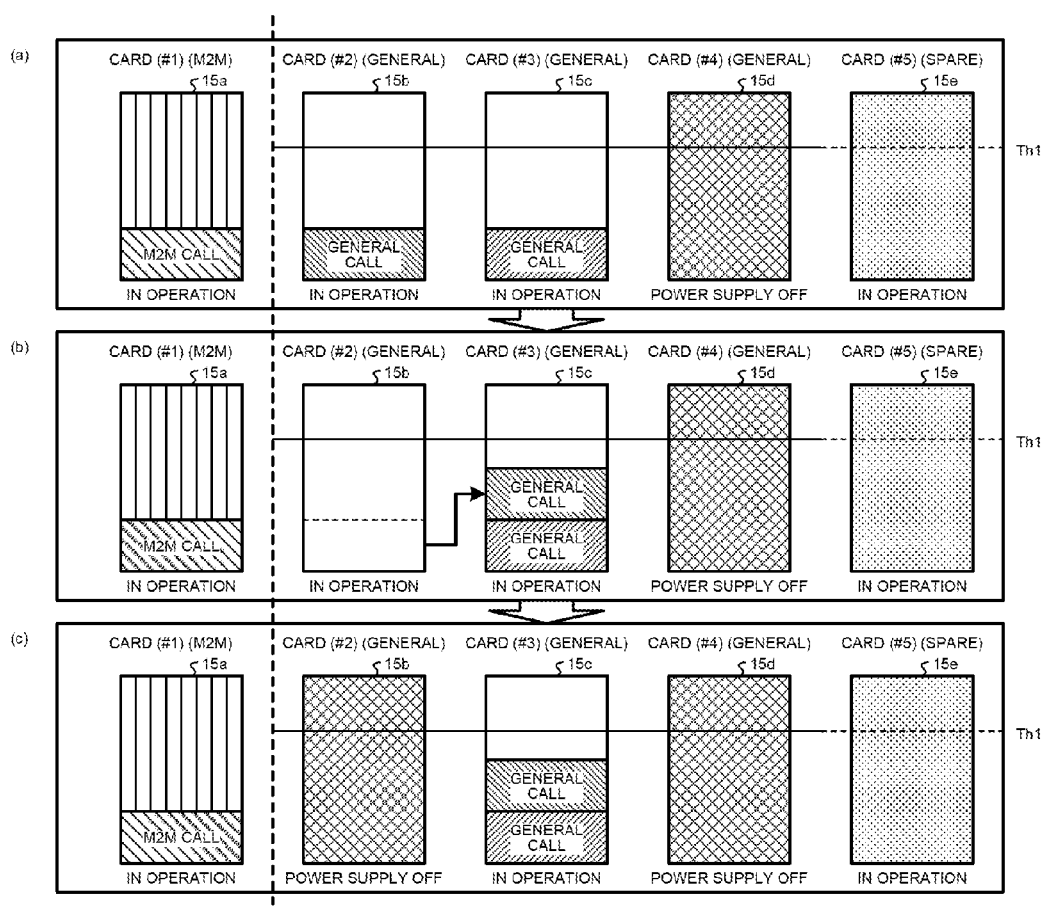
FIG. 16A is a schematic diagram illustrating an example of the processing call transfer process according to the fourth embodiment.

FIG. 16A is a schematic diagram illustrating an example of the processing call transfer process according to the fourth embodiment. The state indicated by (a) illustrated in FIG. 16A indicates that the card 15a is in the operation state as the M2M card and indicates that the cards 15b and 15c is in the operation state as the general card. Furthermore, the state indicated by (a) illustrated in FIG. 16A indicates that the card 15d is in the off state of the power supply as the general card and indicates that the card 15e is in the operation state as the spare card. In each of the cards 15b to 15d, Th1 that is the threshold of the amount of call to be processed is set. The call that is being subjected to the call process in the card 15b indicated by (a) illustrated in FIG. 16A satisfies the processing call move condition described above even if the call is moved to the card 15c. Thus, as indicated by (b) illustrated in FIG. 16A, the call that is being subjected to the call process in the card 15b is moved to the card 15c. Then, as indicated by (c) illustrated in FIG. 16A, the power supply is shut off in the card 15b, in which the amount of processed call becomes zero.

Figure 16B:
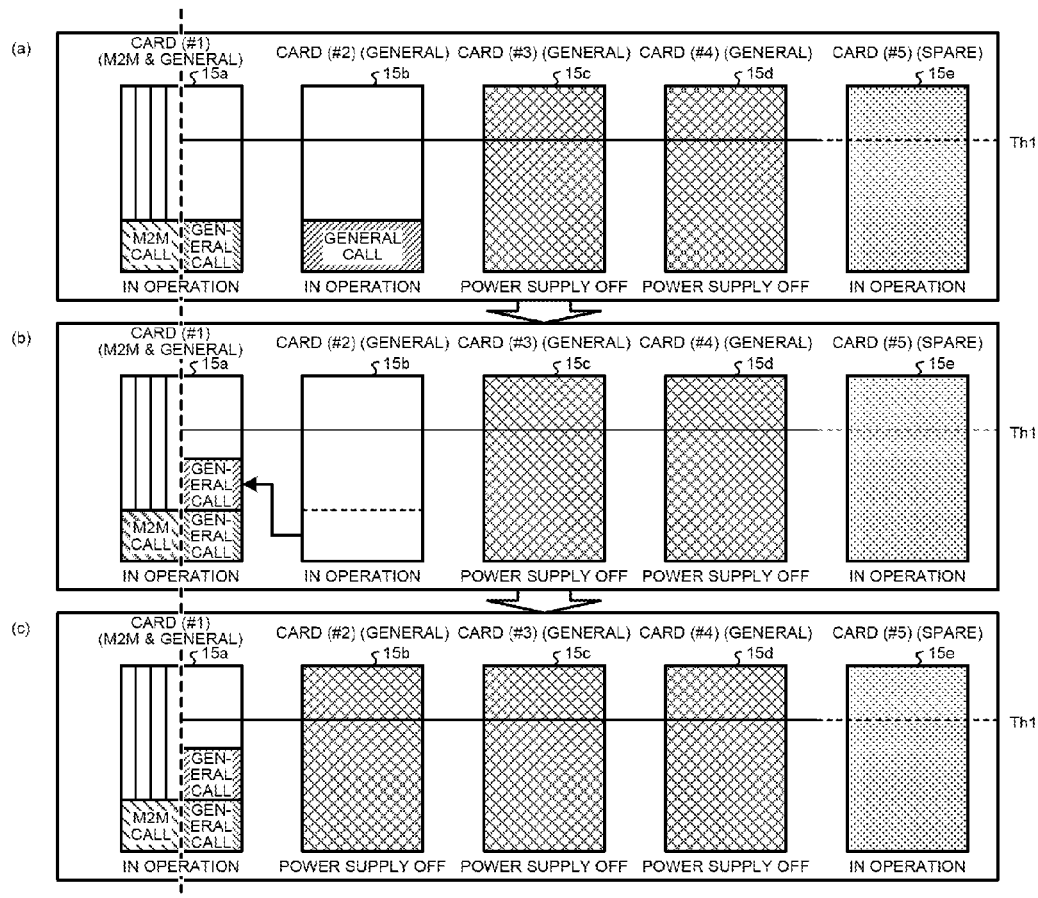
FIG. 16B is a schematic diagram illustrating an example of the processing call transfer process according to the fourth embodiment.

Furthermore, FIG. 16B is a schematic diagram illustrating an example of the processing call transfer process according to the fourth embodiment. The state indicated by (a) illustrated in FIG. 16B indicates that half of the card 15a is in the operation state as the M2M card and indicates that half of the card 15a and the card 15b are in the operation state as the general card. Furthermore, the state indicated by (a) illustrated in FIG. 16B indicates that the cards 15c and 15d are in the off state of the power supply as the general card and indicates that the card 15e is in the operation state as the spare card. In the half of the card 15a and in the cards 15b to 15d, Th1 that is the threshold of the amount of call to be processed is set. FIG. 16B indicates an example in which a call to be processed is moved, with priority, to the card 15a that is in operation and in which a half area is allocated to the M2M card.

The call that is being subjected to the call process in the card 15b indicated by (a) illustrated in FIG. 16B satisfies the processing call move condition described above even if the call is moved to the general card area in the card 15a that is in operation as the general card. Thus, as indicated by (b) illustrated in FIG. 16B, the call that is being subjected to the call process in the card 15b is moved to the general card area in the card 15a. Furthermore, as indicated by (c) illustrated in FIG. 16B, the power supply in the card 15b, in which the amount of processed call becomes zero, is shut off.

Advantage of the Fourth Embodiment

In the fourth embodiment, if a plurality of general calls is being subjected to call process in a plurality of general cards, the calls to be processed are moved to one or more general cards, whereby the general calls are collectively processed in the general cards at the move destination. Consequently, the fourth embodiment can reduce, in the base station device 10D, the number of cards started up as the general cards and can implement a reduction in electrical power consumption.

[e] Fifth Embodiment

In the fifth embodiment, the base station device determines and changes, on the basis of a rate of increase in a general processing call, the threshold (channel threshold) for performing threshold determination that is related to an amount of call to be processed in the general card with the immediately previous number and that is used as a trigger when the general card with the immediately subsequent number is started up. Furthermore, because the fifth embodiment is the same as the first embodiment except that the threshold for performing threshold determination that is related to an amount of call to be processed in the general card with the immediately previous number and that is used as a trigger when the general card with the immediately subsequent number is started up is determined and changed on the basis of a rate of increase in a general processing call, descriptions will be omitted.

Base Station Device According to the Fifth Embodiment

FIG. 17A is a block diagram illustrating an example of a base station device according to a fifth embodiment. FIG. 17A illustrates only the block related to the fifth embodiment from among blocks in a base station device 10E according to the fifth embodiment and other blocks are omitted. Furthermore, in the base station device 10E illustrated in FIG. 17A, the blocks having the same reference numerals as those in the base station device 10A illustrated in FIG. 1A have the same configuration or the similar functions as those in the base station device 10A illustrated in FIG. 1A except for the following points described below; therefore, descriptions thereof will be omitted.

As illustrated in FIG. 17A, a call processing unit 12E in the base station device 10E according to the fifth embodiment further includes a threshold control unit 12g. As will be described later, the threshold control unit 12g determines and changes, on the basis of a rate of increase in a general processing call, the threshold for performing threshold determination that is related to an amount of call to be processed in the general card with the immediately previous number and that is used as a trigger when the general card with the immediately subsequent number is started up.

Furthermore, a storing unit 13E in the base station device 10E further includes a processing call growth rate storing table 13c.

FIG. 17B is a schematic diagram illustrating an example of a processing call growth rate storing table according to the fifth embodiment. As illustrated in FIG. 17B, the processing call growth rate storing table 13c stores therein, in an associated manner, the "processing call amount growth rate" and the "time stamp". The "processing call amount growth rate" indicates a rate of increase in an amount of call for each general card calculated in the base station device 10E. The "processing call amount growth rate" is obtained by measuring an amount of call that is being processed at two different times in, for example, each of the general cards and is then calculated as the rate of change in the amount of call measured at two different times. The "time stamp" is the date and time at which the "processing call amount growth rate" is calculated.

Figure 18A:
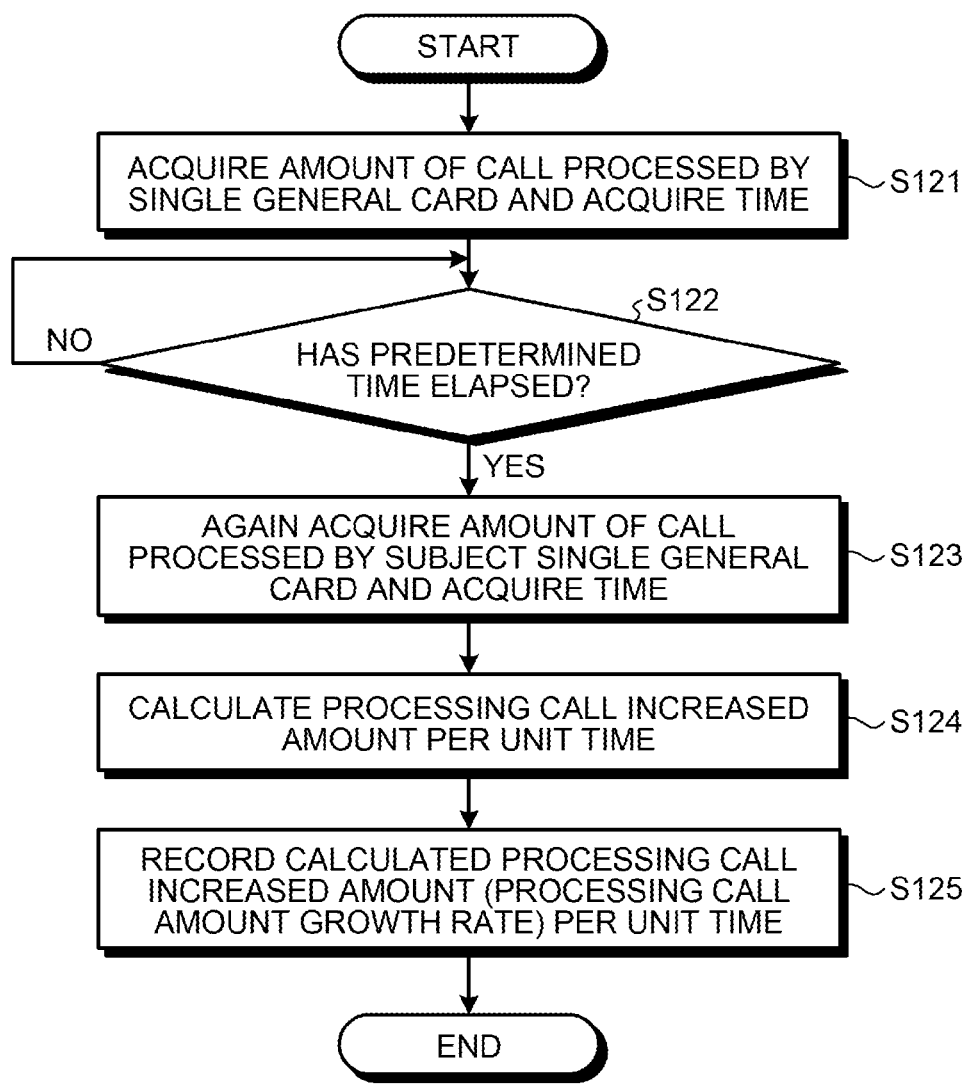
FIG. 18A is a flowchart illustrating a processing call amount growth rate calculation process according to the fifth embodiment.

Processing Call Amount Growth Rate Calculation Process According to the Fifth Embodiment FIG. 18A is a flowchart illustrating a processing call amount growth rate calculation process according to the fifth embodiment. The processing call amount growth rate calculation process is performed at a predetermined period for each general card. First, the threshold control unit 12g acquires a call amount m of a call that is being processed by a single general card and acquires the time A (Step S121). Then, the threshold control unit 12g determines whether a predetermined time has elapsed (Step S122). If the predetermined time has elapsed (Yes at Step S122), the threshold control unit 12g performs the process indicated by Step S123. In contrast, if the predetermined time has not elapsed (No at Step S122), the threshold control unit 12g again repeatedly performs the process indicated by Step S122.

At Step S123, for the general card in which the call amount m of a call that is being processed at Step S121 and the time A are acquired, the threshold control unit 12g again acquires a call amount n of a call that is being processed and the time B. Then, the threshold control unit 12g calculates, from the amount of call to be processed and the time acquired at Steps S121 and S123, a "processing call amount growth rate" per unit time (Step S124). At Step S124, by calculating, for example, (n−m)/(B−A), the threshold control unit 12g calculates the "processing call amount growth rate" per unit time. Then, the threshold control unit 12g records the "processing call amount growth rate" calculated at Step S124 in the processing call growth rate storing table 13c (see FIGS. 17A and 17B) (Step S125). After the end of the process at Step S125, the threshold control unit 12g ends the processing call amount growth rate calculation process.

Threshold Setting Process According to the Fifth Embodiment

Figure 18B:
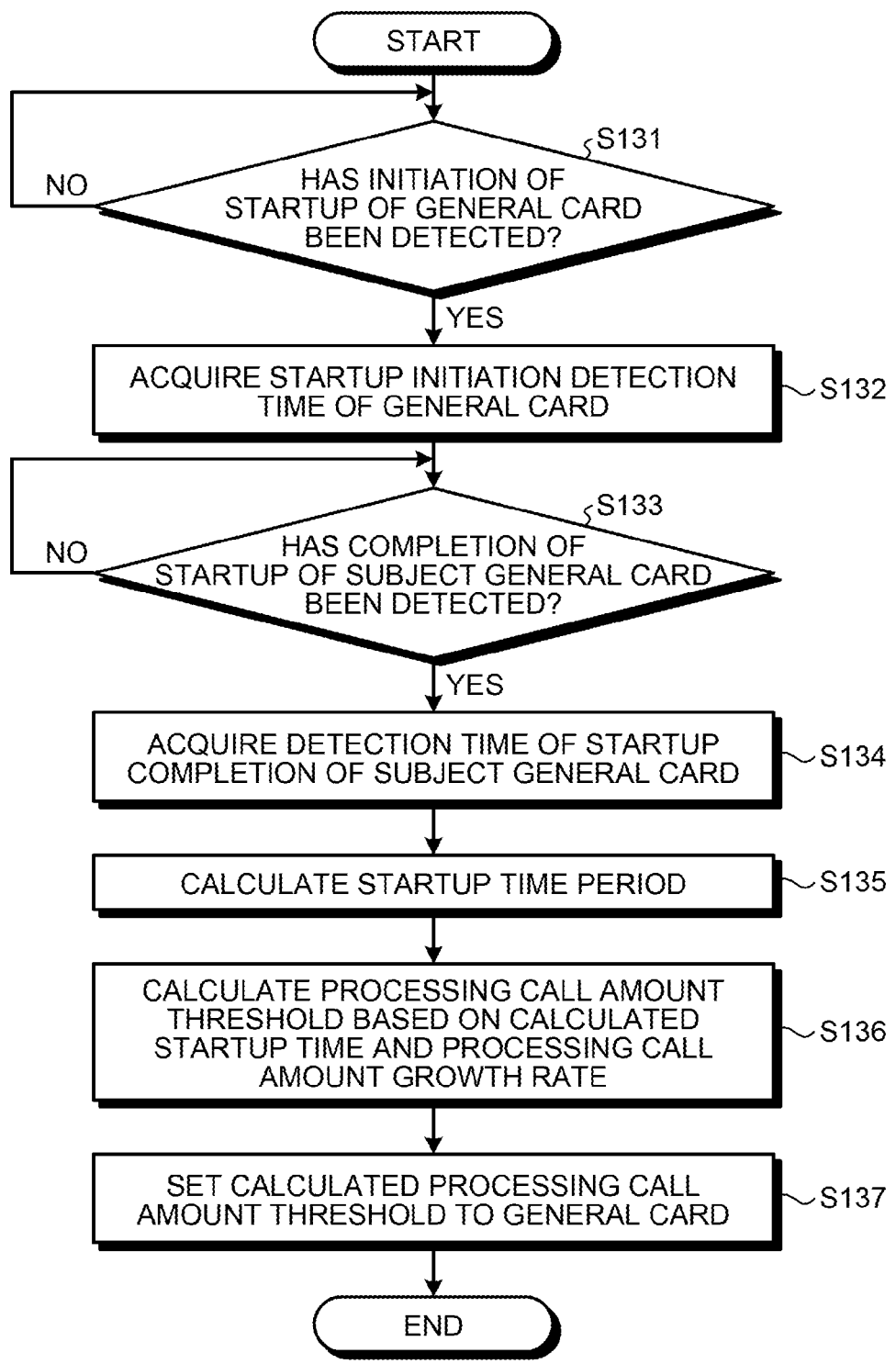
FIG. 18B is a flowchart illustrating an example of a threshold setting process according to the fifth embodiment.

FIG. 18B is a flowchart illustrating an example of a threshold setting process according to the fifth embodiment. The threshold setting process is a process of setting a processing call amount threshold (channel threshold) such that a startup time period of the general card is equal to or less than the time period after an amount of call that is being processed in the general card exceeds the processing call amount threshold (channel threshold) until the amount reaches the limit value. The threshold setting process is performed every time, for example, the general card is started up.

First, the threshold control unit 12g determines whether the initiation of the startup of the general card has been detected (Step S131). If the threshold control unit 12g detects the initiation of the startup of the general card (Yes at Step S131), the threshold control unit 12g performs the process indicated by Step S132. In contrast, if the threshold control unit 12g does not detect the initiation of the startup of the general card (No at Step S131), the threshold control unit 12g again repeats the process indicated by Step S131.

At Step S132, the threshold control unit 12g acquires the startup initiation detection time of the general card in which the initiation of the startup was detected at Step S131. Then, the threshold control unit 12g determines whether the completion of the startup of the general card, in which the initiation of the startup was detected at Step S131, is detected (Step S133). If the threshold control unit 12g detects the completion of the startup of the general card in which the initiation of the startup was detected at Step S131 (Yes at Step S133), the threshold control unit 12g performs the process indicated by Step S134. In contrast, if the threshold control unit 12g does not detect the completion of the startup of the general card in which the initiation of the startup was detected at Step S131 (No at Step S133), the threshold control unit 12g again repeats the process indicated by Step S133.

At Step S134, the threshold control unit 12g acquires the detection time of the startup completion of the general card in which the completion of the startup was detected at Step S133. Then, the threshold control unit 12g calculates, as the startup time period, the period of time from the detection time of the startup completion acquired at Step S134 to the detection time of the startup initiation acquired at Step S132 (Step S135).

Then, the threshold control unit 12g calculates a processing call amount threshold on the basis of both the startup time period calculated at Step S135 and the "processing call amount growth rate" recorded in the processing call growth rate storing table 13c (Step S136). For example, the threshold control unit 12g calculates, as an amount of call that is increased until the card has been started up, a result obtained by multiplying the average of the "processing call amount growth rates" recorded in the processing call growth rate storing table 13c by the startup time period that is calculated at Step S135. Then, the threshold control unit 12g subtracts the amount of call that is increased until the card has been started up from the total amount of the amount of call to be processed per single card and calculates the subtracted value as the processing call amount threshold (channel threshold). However, the threshold control unit 12g may also multiply the amount of call that is increased until the card has been started up by α (α>1, for example, α=1.1 or the like) and a safety margin may also be included in the processing call amount threshold.

Then, the threshold control unit 12g sets the processing call amount threshold (channel threshold) calculated at Step S136 to all of the general cards (Step S137). After the end of the process at Step S137, the threshold control unit 12g ends the threshold setting process.

Furthermore, the average of the "processing call amount growth rates" that is used by the threshold control unit 12g at the time of calculation of the processing call amount threshold (channel threshold) at Step S136 may also be the average of the "processing call amount growth rates" of all of the general cards. Furthermore, the average of the "processing call amount growth rates" that is used by the threshold control unit 12g at the time of calculation of the processing call amount threshold (channel threshold) at Step S136 may also be the average of the "processing call amount growth rates" for each general card.

Furthermore, the threshold control unit 12g may also set, at Step S137, the processing call amount threshold (channel threshold) for each general card in which the initiation of the startup was detected at Step S131. For example, the threshold control unit 12g may also use the average of the "processing call amount growth rate" for each general card and set the processing call amount threshold (channel threshold) for each general card in which the initiation of the startup was detected at Step S131. In this case, the threshold control unit 12g can set, for each general card, the processing call amount threshold (channel threshold) in which the characteristic of the startup time of individual cards is reflected.

Advantage of the Fifth Embodiment

In the fifth embodiment, because the setting of the processing call amount threshold (channel threshold) to the general card is determined on the basis of a statistic, the startup timing of the general card can be more appropriately controlled by rationally setting a threshold. Consequently, the fifth embodiment can reduce, in the base station device 10E, the number of general cards to be started up and can implement, in the base station device 10E, a reduction in electrical power consumption.

Each of the functioning units that perform each of the processes described in the above embodiments may also be implemented by, for example, an NWP, a CPU, an MPU, an ASIC, and an FPGA executing a predetermined program. The MPU is an abbreviation of a Micro Processing Unit. Furthermore, the ASIC is an abbreviation of an Application Specific Integrated Circuit and the FPGA is an abbreviation of a Field Programmable gate array.

Furthermore, each of the tables indicated in the embodiments described above, a predetermined program, and predetermined data that implement the function performed by each of the functioning units may also be stored in a random access memory (RAM) or a flash memory. Alternatively, the tables, the program, and the data may also be stored in a storage device that includes each of the tables indicated in the embodiments described above, a magnetic disk, a magneto-optic disk, or the like as a storage medium.

According to an aspect of an embodiment, an advantage is provided in that it is possible to reduce electrical power consumed in a base station device.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A base station device comprising:
a first signal processing card that performs signal processing related to M2M (Machine to Machine) communication with a radio communication terminal;

a second signal processing card that performs signal processing related to general communication, which is other than the M2M communication, with a radio communication terminal;

a memory; and a processor coupled to the memory, wherein the processor is configured to:

determine, from a user identifier of a radio communication terminal received from the radio communication terminal, whether the type of communication with the radio communication terminal is the M2M communication;

allocate, to the first signal processing card, the signal processing related to the M2M communication with the radio communication terminal in which the type of communication is determined to be the M2M communication, and allocate, to the second signal processing card, the signal processing related to the general communication with the radio communication terminal in which the type of communication is determined to be the general communication; and supply power to the first signal processing card and the second signal processing card individually.

2. The base station device according to claim 1, wherein the processor is further configured to;

store therein the user identifier of the radio communication terminal that performs the M2M communication in the memory, and determine, when a user identifier received from a radio communication terminal is stored in the memory or when a notification indicating that a user identifier received from a radio communication terminal is mapped on an M2M terminal that performs the M2M communication is received from a higher-level device, that the type of communication with the radio communication terminal is the M2M communication.

3. The base station device according to claim 1, wherein the processor is further configured to;

decide the number of the first signal processing cards in accordance with an actual measurement value or a predicted value of an amount of call to be processed in the first signal processing card, and allocate the signal processing related to the M2M communication with the radio communication terminal in which the type of communication is determined to be the M2M communication to one of the first signal processing cards the number of which is decided.

4. The base station device according to claim 1, wherein the processor is further configured to, when, in the second signal processing card, an amount of signal processing related to the general communication reaches the maximum value of an amount of call that is processed by the second signal processing card, allocate, to the first signal processing card, signal processing related to the general communication that is newly received.

5. The base station device according to claim 1, further comprising a spare card that is different from the first signal processing card and the second signal processing card and in which the power supply is always applied, wherein the processor is further configured to, when, in the first signal processing card, an amount of signal processing related to the M2M communication reaches the maximum value of an amount of call that is processed by the first signal processing card, allocate, to the spare card, signal processing related to the M2M communication that is newly received.

6. The base station device according to claim 1, wherein the processor is further configured to;

supply power to the first signal processing card regardless of whether the signal processing related to the M2M communication is allocated to the first signal processing card, supply power to the second signal processing card when the signal processing related to the general communication is allocated to the second signal processing card, and shut off supplied power to the second signal processing card when the signal processing related to the general communication is not allocated to the second signal processing card.

* * * * *